United States Patent
Luo et al.

(10) Patent No.: US 12,342,271 B2
(45) Date of Patent: Jun. 24, 2025

(54) COMMUNICATION METHOD AND COMMUNICATION APPARATUS

(71) Applicant: Huawei Technologies Co., Ltd., Shenzhen (CN)

(72) Inventors: Haiyan Luo, Shenzhen (CN); Mingzeng Dai, Shenzhen (CN); Qinghai Zeng, Shanghai (CN); Fei Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 17/890,081

(22) Filed: Aug. 17, 2022

(65) Prior Publication Data

US 2022/0394608 A1 Dec. 8, 2022

Related U.S. Application Data

(63) Continuation of application No. PCT/CN2020/075598, filed on Feb. 17, 2020.

(51) Int. Cl.
*H04W 48/18* (2009.01)
*H04W 60/00* (2009.01)

(52) U.S. Cl.
CPC .......... *H04W 48/18* (2013.01); *H04W 60/00* (2013.01)

(58) Field of Classification Search
CPC .... H04L 45/306; H04W 24/02; H04W 48/12; H04W 48/16; H04W 48/18; H04W 60/00; H04W 92/12
See application file for complete search history.

(56) References Cited

U.S. PATENT DOCUMENTS

| 2018/0124660 A1* | 5/2018 | Zhang | H04W 84/02 |
| 2018/0317163 A1* | 11/2018 | Lee | H04W 48/18 |
| 2023/0074413 A1* | 3/2023 | Chun | H04W 24/10 |

FOREIGN PATENT DOCUMENTS

| CN | 108347751 A | 7/2018 |
| CN | 108616959 A | 10/2018 |
| CN | 109151906 A | 1/2019 |
| CN | 109246775 A | 1/2019 |
| CN | 110022583 A | 7/2019 |

(Continued)

OTHER PUBLICATIONS

"Slice exchange during NG Setup," 3GPP TSG-RAN WG3 Meeting # 96, Hangzhou, China, R3-171767, Total 2 pages, 3rd Generation Partnership Project, Valbonne, France (May 15-19, 2017).

(Continued)

*Primary Examiner* — Timothy X Pham
(74) *Attorney, Agent, or Firm* — Leydig, Voit & Mayer, Ltd.

(57) ABSTRACT

A communication method and a communication apparatus are provided to send, to a terminal device by using an RRC message, information about at least one first network slice corresponding to a first identifier. The method includes: a first access network device broadcasts a first identifier, where the first identifier identifies information about a first access network slice; and the first access network device sends a radio resource control RRC message to a terminal device, where the RRC message includes information about at least one first network slice corresponding to the first identifier.

20 Claims, 7 Drawing Sheets

(56) References Cited

FOREIGN PATENT DOCUMENTS

| CN | 107071799 B | 12/2019 |
| CN | 110636579 A | 12/2019 |
| JP | WO 2018/180871 * | 3/2018 |
| WO | 2017119844 A1 | 7/2017 |
| WO | 2018177368 A1 | 10/2018 |
| WO | 2018204209 A1 | 11/2018 |
| WO | 2018219352 A1 | 12/2018 |
| WO | 2019024816 A1 | 2/2019 |

OTHER PUBLICATIONS

Huawei, "Support of Network Slice Discovery" 3GPP TSG-RAN WG3 Meeting #93bis, Sophia Antipolis, France, R3-162462, 4 pages, 3rd Generation Partnership Project, Valbonne, France (Oct. 10-14, 2016).

Qualcomm Incorporated, "Consideration of slicing in cell reselection," 3GPP TSG-RAN WG2 Meeting #101, Athens, Greece, R2-1803581, Total 3 pages, 3rd Generation Partnership Project, Valbonne, France (Feb. 26-Mar. 2, 2018).

Huawei et al., "Slice Availability for Cell (Re-)Selection," 3GPP TSG-RAN WG2 Adhoc#2, Qingdao, China, R2-1706775, Total 4 pages, rd Generation Partnership Project, Valbonne, France (May 27-29, 2017).

Huawei et al., "Slice Availability and Discovery in RAN," 3GPP TSG-RAN WG2 NR Ad Hoc, Spokane, Washington, USA, R2-1700102, Total 5 pages, 3rd Generation Partnership Project, Valbonne, France (Jan. 17-19, 2017).

* cited by examiner

COMMUNICATION METHOD AND COMMUNICATION APPARATUS

CROSS-REFERENCE TO RELATED APPLICATIONS

This application is a continuation of International Application No. PCT/CN2020/075598, filed on Feb. 17, 2020, the disclosure of which is hereby incorporated by reference in its entirety.

TECHNICAL FIELD

This application relates to the communication field, and more specifically, to a communication method and a communication apparatus.

BACKGROUND

In a 5th generation (5G) communication system, a network slice is introduced. A network slice satisfies a connection communication service requirement of a type or a use case. The 5G system may include a large quantity of network slices that meet different connection capabilities. With introduction of the network slice concept, a physical network of an operator is divided into a plurality of virtual networks. Each virtual network is obtained through division based on different service quality requirements, such as latency, bandwidth, security, and reliability, to flexibly adapt to different network application scenarios. As a mandatory feature of the 5G network, the network slice is an end-to-end concept. A network slice includes a radio access network (RAN) part and a core network part.

Different network slices may be represented by using network slice selection identifiers, such as single network slice selection assistance information (S-NSSAI). Each piece of S-NSSAI includes a slice/service type (SST) and a slice differentiator (SD). The SST differentiates services, and the SD differentiates tenants. An access management function (AMF) of a current core network sends allowed single network slice selection assistance information (allowed S-NSSAI) to a terminal device, so that the terminal device determines accessible services of specific slices. Currently, a network slice defined in the 3rd Generation Partnership Project (3GPP) cannot adapt to a communication requirement of the terminal device.

SUMMARY

In view of this, this application provides a communication method and a communication apparatus, to adapt to a communication requirement of a terminal device.

According to a first aspect, a communication method is provided. The method may be performed by a first access network device, or may be performed by an apparatus (for example, one or more of a chip, a processor, or a chip system) in the first access network device. The method includes: the first access network device broadcasts a first identifier, where the first identifier identifies information about a first access network slice; and the first access network device sends a radio resource control RRC message to a terminal device, where the RRC message includes information about at least one first network slice corresponding to the first identifier. The first access network device sends, to the terminal device by using the RRC message, the information about the at least one first network slice corresponding to the first identifier. In this way, regardless of whether the terminal device moves in a TA area, a communication requirement of the terminal device can be met. In addition, herein, the first access network device broadcasts the first identifier, and sends, by using the RRC message, the information about the at least one first network slice corresponding to the first identifier. The broadcast message does not need to include the information about the at least one first network slice corresponding to the first identifier, to help reduce broadcast overheads.

The first access network device may actively send, to the terminal device, the information about the at least one first network slice corresponding to the first identifier, or may send the information based on a request message of the terminal device. In a possible implementation, before that the first access network device sends the RRC message to the terminal device, the method further includes: the first access network device receives a request message from the terminal device, where the request message requests the information about the at least one first network slice corresponding to the first identifier. Herein, after receiving the request message of the terminal device, the first access network device may send, to the terminal device based on the request message, the information about the at least one first network slice corresponding to the first identifier, to pertinently send the information about the at least one first network slice corresponding to the first identifier.

The first access network device may further send information about a network slice supported by a neighboring cell to the terminal device. Optionally, the RRC message further includes a second identifier and information about at least one second network slice corresponding to the second identifier, and the second identifier identifies information about the second access network slice. In this way, after moving into coverage of a second access network device, the terminal device may no longer need to request, from the second access network device, the information about the at least one second network slice corresponding to the second identifier.

In this embodiment of this application, access network devices may exchange identifiers and information about network slices corresponding to the identifiers that are broadcast by the access network devices. In a possible implementation, the method may further include: The first access network device receives a first message from the second access network device, where the first message includes the second identifier and the information about the at least one second network slice corresponding to the second identifier. In this way, the first access network device obtains a second message from the second access network device, so that the terminal device may obtain, in advance, the information that is about the at least one second network slice corresponding to the second identifier and that is of the second access network device, to reduce a procedure in which the terminal device triggers an application for the information about the at least one second network slice corresponding to the second identifier, and help reduce power consumption of the terminal device.

In a possible implementation, the method further includes: the first access network device sends, to the second access network device, the information about the at least one first network slice corresponding to the first identifier. In this way, the first access network device sends, to the second access network device, the information about the at least one first network slice corresponding to the first identifier, so that a terminal device within coverage of the second access network device may obtain, in advance, the information that is about the at least one first network slice corresponding to the first identifier and that is of the first access network device, to reduce a procedure in which the terminal device triggers an application for the information about the at least one first network slice corresponding to the first identifier, and help reduce the power consumption of the terminal device.

According to a second aspect, a communication method is provided. The method may be performed by a terminal device, or may be performed by an apparatus (for example, one or more of a chip, a processor, or a chip system) in the terminal device. The method includes: the terminal device obtains a first identifier, where the first identifier identifies information about a first access network slice; and the terminal device receives an RRC message from a first access network device, where the RRC message includes information about at least one first network slice corresponding to the first identifier. Herein, the terminal device receives the first identifier sent by the first access network device through broadcast, and obtains, by using the RRC message, the information about the at least one first network slice corresponding to the first identifier. In this way, regardless of whether the terminal device moves in a TA area, a communication requirement of the terminal device can be met. In addition, this helps broadcast overheads of the first access network device.

In a possible implementation, before that the terminal device receives the RRC message from the first access network device, the method further includes: the terminal device sends a request message to the first access network device, where the request message requests the information about the at least one first network slice corresponding to the first identifier. Herein, the terminal device may actively request, from the first access network device, the information about the at least one first network slice corresponding to the first identifier, to pertinently obtain the information about the at least one first network slice corresponding to the first identifier.

Optionally, the RRC message further includes a second identifier and information about at least one second network slice corresponding to the second identifier, and the second identifier identifies information about the second access network slice. In this way, after moving into coverage of a second access network device, the terminal device may obtain, in advance, the information that is about the at least one second network slice corresponding to the second identifier and that is of the second access network device, to reduce a procedure in which the terminal device triggers an application for the information about the at least one second network slice corresponding to the second identifier, and help reduce power consumption of the terminal device.

According to a third aspect, a communication method is provided. The method may be performed by a terminal device, or may be performed by an apparatus (for example, one or more of a chip, a processor, or a chip system) in the terminal device. The method includes: the terminal device receives a paging message from a network device, where the paging message includes information about a first network slice; and the terminal device performs cell reselection if a cell in which the terminal device is currently located does not support the first network slice. This helps the terminal device select a suitable cell.

In a possible implementation, that the terminal device performs cell reselection includes: the terminal device performs cell reselection based on a first mapping relationship, where the first mapping relationship includes the information about the first network slice and information about a second network slice, and there is a remapping relationship between the information about the first network slice and the information about the second network slice. The first mapping relationship represents a mapping relationship between network slices. When the terminal device cannot find a cell or an access network device that supports the first network slice in the paging message, if the terminal device has received a first mapping relationship obtained through network slice remapping, the terminal device may further perform cell reselection by using the first mapping relationship, to help increase a probability of selecting the suitable cell.

Optionally, that the terminal device performs cell reselection based on the first mapping relationship includes: if the cell in which the terminal device is currently located supports the second network slice, the terminal device initiates a random access procedure in the cell in which the terminal device is currently located; or if the cell in which the terminal device is currently located does not support the second network slice, the terminal device selects a cell that supports the second network slice. In this way, the terminal device determines whether the cell in which the terminal device is currently located supports the second network slice, to help increase the probability of selecting the suitable cell.

Optionally, if the terminal device selects a cell that supports the second network slice, the method further includes: the terminal device sends a second message to a network device (an access network device or a core network element), where the second message includes the information about the first network slice and the information about the second network slice, or the second message includes the information about the second network slice. In other words, if the terminal device selects the cell that supports the second network slice, the terminal device may notify the access network device or the core network element of the information about the second network slice, so that the access network device or the core network element learns of the cell selected by the terminal device.

In a possible implementation, if the terminal device fails to select a cell, the method further includes: the terminal device sends a third message to the network device, where the third message notifies that the terminal device fails to select the cell. Herein, that "the terminal device fails to select a cell" may include: the terminal device fails to select a cell by using the first mapping relationship. That is, if the terminal device fails to select the cell, the terminal device may notify the access network device or the core network element that the terminal device fails to select the cell, so that the access network device or the core network element learns that the terminal device fails to select the cell.

Optionally, the method further includes: the terminal device obtains information about a network slice supported by the cell in which the terminal device is currently located. The information about the network slice supported by the cell in which the terminal device is currently located may include information about at least one network slice. For example, the terminal device receives the information that is about the network slice supported by the cell in which the terminal device is currently located and that is sent by a first access network device, to perform determining with reference to the information about the network slice supported by the cell in which the terminal device is currently located.

According to a fourth aspect, a communication method is provided. The method may be performed by a core network element, or may be performed by an apparatus (for example, one or more of a chip, a processor, or a chip system) in the core network element. The method includes: the core network element determines a priority of each of at least one network slice; and the core network element sends a fourth message, where the fourth message includes an identifier of each network slice and the priority corresponding to each network slice. Herein, the core network element may send the identifier of each network slice and the priority corresponding to each network slice to the terminal device, so that the terminal device selects a more suitable cell.

Optionally, the fourth message is a non-access stratum message sent by the core network element to the terminal device.

According to a fifth aspect, a communication method is provided. The method may be performed by a terminal device, or may be performed by an apparatus (for example, one or more of a chip, a processor, or a chip system) in the terminal device. The method includes: the terminal device obtains priority information of each of at least one network slice; and the terminal device performs cell selection or cell reselection based on the priority information of each network slice. Herein, the terminal device may obtain an identifier of each network slice and a priority corresponding to each network slice that are sent by the core network element, to select a more suitable cell.

In a possible implementation, if the terminal device is located in a first cell, that the terminal device performs cell selection or cell reselection based on the priority information of each network slice includes: The terminal device selects a first network slice from the at least one network slice, where a priority of the first network slice is the highest in the at least one network slice. The terminal device determines whether the first cell supports the first network slice. When the first cell does not support the first network slice, the terminal device performs cell search to obtain a second cell, and determines whether the second cell supports the first network slice. When the second cell supports the first network slice, the terminal device adds the second cell to a candidate cell set, and continues to search and perform the foregoing actions until no new cell is found. When the candidate cell set is not empty, the terminal device selects to camp on a cell with the best signal (for example, highest receive power or highest signal strength) in the candidate cell set; or when the candidate cell set is empty, the terminal device selects a second network slice, and continues to perform cell search until a suitable cell is selected, where a priority of the second network slice is lower than the priority of the first network slice. When the first cell supports the first network slice, the terminal device continues to camp on the first cell. The first cell is a cell on which the terminal device currently camps, and the terminal device preferably considers the first cell. In this way, when the terminal device is in the cell to be camped on, the terminal device can also select a more suitable cell with reference to the priority corresponding to the network slice.

In a possible implementation, that the terminal device performs cell selection or cell reselection based on the priority information of each network slice includes: the terminal device selects a first network slice from the at least one network slice, where a priority of the first network slice is the highest in the at least one network slice; the terminal device performs cell search to obtain a third cell; determines whether the third cell supports the first network slice; and when the third cell supports the first network slice, the terminal device adds the third cell to a candidate cell set, and continues to search and perform the foregoing actions until no new cell is found. When the candidate cell set is not empty, the terminal device selects to camp on a cell with the best signal (for example, highest receive power or highest signal strength) in the candidate cell set; or when the candidate cell set is empty, the terminal device selects a second network slice, where a priority of the second network slice is lower than the priority of the first network slice, and continues to perform cell search until a suitable cell is selected. In this way, when the terminal device is not in the cell to be camped on, the terminal device can also select a more suitable cell with reference to the priority corresponding to the network slice.

Optionally, that the terminal device obtains priority information of each of at least one network slice includes:

The terminal device receives a fourth message from the core network element, where the fourth message includes the identifier of each network slice and the priority corresponding to each network slice, so that cell selection or reselection can be performed by using the priority corresponding to each network slice.

According to a sixth aspect, a communication method is provided. The method may be performed by an access network device, or may be performed by an apparatus (for example, one or more of a chip, a processor, or a chip system) in the access network device. The method includes: the access network device determines a priority of each of at least one network slice for a first frequency; and the access network device sends a fifth message, where the fifth message includes the first frequency, an identifier of each network slice, and the priority corresponding to each network slice. Herein, the access network device may determine the priority of each network slice for the at least one network slice corresponding to each frequency, and send the priority of each network slice to the terminal device, so that the terminal device selects a more suitable cell by using the priority of the network slice.

According to a seventh aspect, a communication method is provided. The method may be performed by an access network device, or may be performed by an apparatus (for example, one or more of a chip, a processor, or a chip system) in the access network device. The method includes: the access network device determines a priority of each of at least one frequency for a first network slice; and the access network device sends a sixth message, where the sixth message includes an identifier of the first network slice, an identifier of each frequency, and the priority corresponding to each frequency. Herein, the access network device may determine the priority of each frequency for the at least one frequency corresponding to each network slice, and send the priority of each frequency to the terminal device, so that the terminal device selects a more suitable cell by using the priority of the frequency.

According to an eighth aspect, a communication method is provided. The method may be performed by a terminal device, or may be performed by an apparatus (for example, one or more of a chip, a processor, or a chip system) in the terminal device. The method includes: the terminal device obtains a priority of each of at least one frequency for a first network slice; and the terminal device performs cell selection at a first frequency, where the first frequency is a frequency with the highest priority in the at least one frequency. Herein, the terminal device may select the first frequency from the at least one frequency based on the priority of each frequency, and the first frequency is the frequency with the highest priority in the at least one frequency. Then, the terminal device performs cell search at the first frequency, to help select a more suitable cell.

In a possible implementation, the method further includes: if the terminal device finds no cell at the first frequency, the terminal device performs cell search at a second frequency, to select a suitable frequency to perform cell search, where a priority of the second frequency is lower than that of the first frequency. For example, the first frequency is the frequency with the highest priority, and the second frequency is a frequency with the second highest priority.

Optionally, that the terminal device obtains a priority of each of at least one frequency for a first network slice includes: the terminal device receives a sixth message from a network device, where the sixth message includes an identifier of the first network slice, an identifier of each frequency, and the priority corresponding to each frequency. Herein, the terminal device learns of the priority corresponding to each frequency from the network device, so that the terminal device can perform cell selection or reselection by using the priority corresponding to each frequency, to help select a suitable cell.

According to a ninth aspect, a communication apparatus is provided. The communication apparatus includes a module configured to perform the method according to the first aspect or any possible implementation of the first aspect; includes a module configured to perform the method according to the sixth aspect or any possible implementation of the sixth aspect; or includes a module configured to perform the method according to the seventh aspect or any possible implementation of the seventh aspect.

According to a tenth aspect, a communication apparatus is provided. The communication apparatus includes a module configured to perform the method according to the second aspect or any possible implementation of the second aspect; includes a module configured to perform the method according to the third aspect or any possible implementation of the third aspect; includes a module configured to perform the method according to the fifth aspect or any possible implementation of the fifth aspect; or includes a module configured to perform the method according to the eighth aspect or any possible implementation of the eighth aspect.

According to an eleventh aspect, a communication apparatus is provided. The communication apparatus includes a module configured to perform the method according to the fourth aspect or any possible implementation of the fourth aspect.

According to a twelfth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to the first aspect or any possible implementation of the first aspect; is configured to implement the method according to the sixth aspect or any possible implementation of the sixth aspect; or is configured to implement the method according to the seventh aspect or any possible implementation of the seventh aspect, by using a logic circuit or by executing code instructions.

According to a thirteenth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to the second aspect or any possible implementation of the second aspect; is configured to implement the method according to the third aspect or any possible implementation of the third aspect; is configured to implement the method according to the fifth aspect or any possible implementation of the fifth aspect; or is configured to implement the method according to the eighth aspect or any possible implementation of the eighth aspect, by using a logic circuit or by executing code instructions.

According to a fourteenth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to the fourth aspect or any possible implementation of the fourth aspect by using a logic circuit or by executing code instructions.

According to a fifteenth aspect, a computer-readable storage medium is provided. The computer-readable storage medium stores a computer program or instructions. When the computer program or the instructions are executed, the method according to any one of the first aspect to the eighth aspect and any possible implementation of the first aspect to the eighth aspect is implemented.

According to a sixteenth aspect, a computer program product including instructions is provided. When the instructions are run, the method according to any one of the first aspect to the eighth aspect and any possible implementation of the first aspect to the eighth aspect is implemented.

According to a seventeenth aspect, a communication chip is provided. The communication chip stores instructions. When the instructions are run on a computer device, the communication chip is enabled to perform the method according to any one of the first aspect to the eighth aspect and any possible implementation of the first aspect to the eighth aspect.

According to an eighteenth aspect, a communication system is provided. The communication system includes one or more of the communication apparatus in the twelfth aspect, the communication apparatus in the thirteenth aspect, and the communication apparatus in the fourteenth aspect.

DESCRIPTION OF EMBODIMENTS

The following describes technical solutions of this application with reference to accompanying drawings.

In embodiments of this application, "a plurality of" may be understood as "at least two" or "two or more"; "a plurality of items" may be understood as "at least two items" or "two or more items".

The technical solutions in embodiments of this application may be applied to various communication systems, for example, a long term evolution (LTE) system, a 5th generation (5G) communication system, a new radio (NR) system, and a future evolved communication system.

Figure 1:
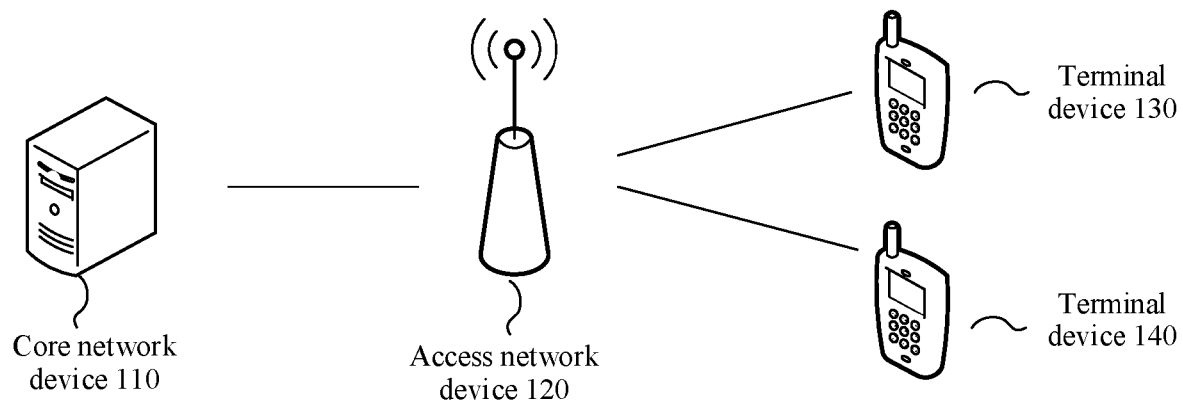
FIG. 1 is a schematic diagram of an architecture of a communication system possibly used in an embodiment of this application.

FIG. 1 is a schematic diagram of an architecture of a communication system possibly used in an embodiment of this application. As shown in FIG. 1, the communication system includes a core network device 110, an access network device 120, and at least one terminal device (for example, a terminal device 130 and a terminal device 140 shown in FIG. 1). The terminal device is connected to the access network device in a wireless manner, and the access network device is connected to the core network device in a wireless or wired manner. The core network device and the access network device may be different physical devices that are independent of each other, or functions of the core network device and logical functions of the access network device may be integrated into a same physical device, or some functions of the core network device and some functions of the access network device may be integrated into one physical device. The terminal device may be located at a fixed location, or may be mobile. FIG. 1 is only a schematic diagram. The communication system may further include another network device, for example, may further include a wireless relay device and a wireless backhaul device, which are not shown in FIG. 1. Quantities of core network devices, access network devices, and terminal devices included in the communication system are not limited in embodiments of this application.

The access network device is an access device used by the terminal device to access the communication system in a wireless manner, and may be a radio access network (RAN) device, a base station NodeB, an evolved NodeB (eNB), a base station (gNB) in a 5G communication system, a transmission point, a base station in a future communication system or an access node in a wireless fidelity (Wi-Fi) system, one or a group of antenna panels (where the group of antenna panels may include a plurality of antenna panels) of a base station in a 5G system, or may be a network node, for example, a baseband unit (BBU), a centralized unit (CU), or a distributed unit (DU) that forms a gNB or a transmission point. A specific technology and a specific device form used for the access network device are not limited in embodiments of this application. In some deployments, the gNB may include a CU and a DU. The gNB may further include an active antenna unit (AAU). The CU implements some functions of the gNB, and the DU implements some functions of the gNB. For example, the CU is responsible for processing an upper-layer protocol and service, to implement functions of a radio resource control (RRC) layer, a service data adaptation protocol (SDAP) layer, and a packet data convergence protocol (PDCP) layer. The DU is responsible for processing a lower-layer protocol and service, to implement functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, upper-layer signaling such as RRC layer signaling may also be considered as being sent by the DU or sent by the DU and the AAU. It may be understood that the access network device may be a device including one or more of a CU node, a DU node, and an AAU node. In addition, the CU may be used as a network device in an access network, or may be used as a network device in the core network (CN). This is not limited in this application.

The access network device provides a service in a cell. A terminal device communicates with the cell by using a transmission resource (for example, a frequency domain resource or a spectrum resource) allocated by the access network device. The cell may be managed by a macro base station (for example, a macro eNB or a macro gNB), or may be managed by a base station corresponding to a small cell. Small cells herein may include a metro cell, a micro cell, a pico cell, a femto cell, and the like. These small cells are characterized by small coverage and low transmit power, and are applicable to providing a high rate data transmission service.

The terminal device may also be referred to as a terminal, user equipment (UE), a mobile station (MS), a mobile terminal (MT), or the like. The terminal device may be a mobile phone, a tablet computer, a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. A specific technology and a specific device form used for the terminal device are not limited in embodiments of this application.

The access network device and the terminal device may be deployed on land, and include an indoor or outdoor device, a handheld device, or a vehicle-mounted device; or may be deployed on water; or may be deployed on a plane, a balloon, and a satellite in air. Application scenarios of the access network device and the terminal device are not limited in embodiments of this application.

Embodiments of this application are applicable to downlink signal transmission, or are applicable to uplink signal transmission, or are applicable to device-to-device (D2D) signal transmission. For the downlink signal transmission, a sending device is an access network device, and correspondingly a receiving device is a terminal device. For the uplink signal transmission, a sending device is a terminal device, and correspondingly a receiving device is an access network device. For the D2D signal transmission, a sending device is a terminal device, and correspondingly a receiving device is also a terminal device.

Communication between the access network device and the terminal device and communication between the terminal devices may be performed by using a licensed spectrum, an unlicensed spectrum, or both a licensed spectrum and an unlicensed spectrum. Communication between the access network device and the terminal device and communication between the terminal devices may be performed by using a spectrum below 6 gigahertz (GHz), a spectrum above 6G, or both a spectrum below 6G and a spectrum above 6G. Spectrum resources used between the access network device and the terminal device are not limited in embodiments of this application.

In embodiments of this application, unless otherwise specified, the network device is an access network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a function module (for example, a processor, a chip, or a chip system) that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable medium" may include but is not limited to a radio channel and various other media that can store, include, and/or carry instructions and/or data.

Figure 2:
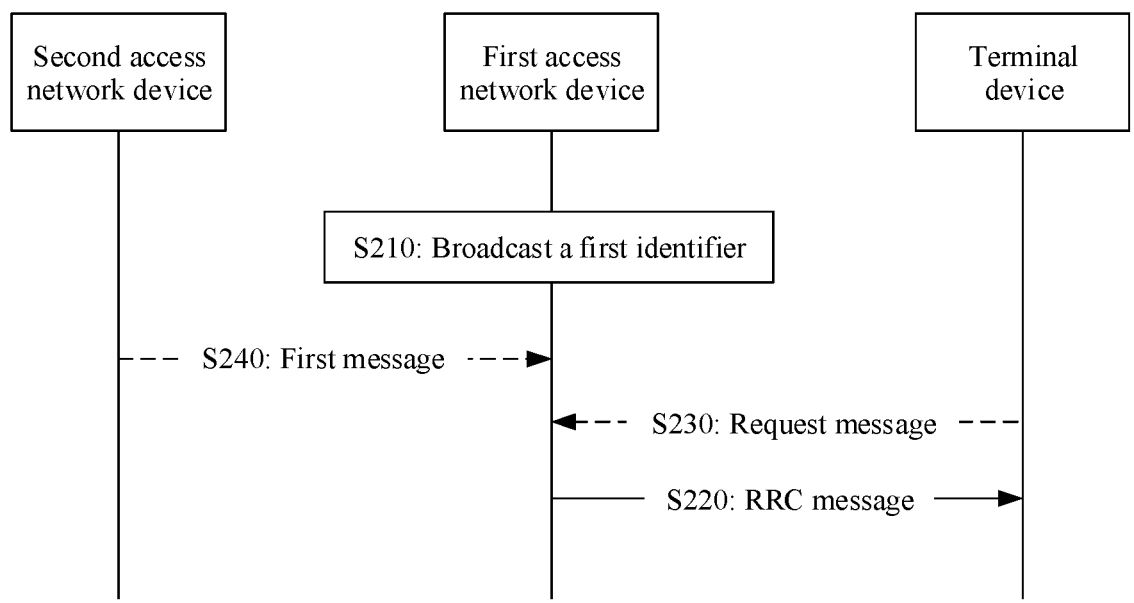
FIG. 2 is a schematic interaction diagram of a communication method according to an embodiment of this application.

FIG. 2 is a schematic interaction diagram of a communication method 200 according to an embodiment of this application. It may be understood that a terminal device in FIG. 2 may be the terminal device (for example, the terminal device 130 or the terminal device 140) in FIG. 1, or may be an apparatus (for example, a processor, a chip, or a chip system) in the terminal device. A first access network device may be the access network device 120 in FIG. 1, or may be an apparatus (for example, a processor, a chip, or a chip system) in the access network device. It may be further understood that some or all information exchanged between the terminal device and the first access network device in FIG. 2, or some or all information exchanged between the first access network device and a second access network device may be carried in an existing message, channel, or signal, or existing signaling, or may be a newly defined message, channel, or signal, or newly defined signaling. This is not specifically limited. As shown in FIG. 2, the method 200 includes the following steps.

S210: The first access network device broadcasts a first identifier, where the first identifier identifies information about a first access network slice. The terminal device may obtain the first identifier broadcast by the first access network device.

The first access network device may broadcast the first identifier in a system message, for example, a master information block (MIB), a system information block (SIB) 1, or another SIBx. Optionally, the first access network device may broadcast, in the system message, a public land mobile network (PLMN) identifier (ID) and a corresponding first identifier. For example, the first access network device broadcasts a PLMN ID #1 and a corresponding first identifier #1 and first identifier #2, and broadcasts a PLMN ID #2 and a corresponding first identifier #3.

Optionally, when the first identifier is included in a SIBx, the first access network device may broadcast the SIBx when requested by the terminal device. To be specific, when the terminal device finds that the SIBx is not broadcast, the terminal device may request, by using a message 1 (msg1) or a message 3 (msg3) in a random access procedure, the first access network device to broadcast the SIBx or a system information (SI) in which the SIBx is located. The first access network device broadcasts, based on the request of the terminal device, the SI or the SIBx requested by the terminal device.

That "the first identifier identifies information about a first access network slice" may include: The first identifier identifies area information, for example, a RAN slice area (RSA) or a RAN part identifier (RAN Part ID), of an access network slice in which the first access network device is located. A network slice may include an access network slice and a core network slice. The access network slice may be understood as a resource used by an access network to carry a network slice service, or may be understood as an identifier of the network slice on an access network side. Therefore, the first identifier may also identify an identifier of the first network slice on the access network side, namely, an access network slice identifier. In a tracking area (TA), access network devices that broadcast a same first identifier support at least one same network slice. Therefore, in the first understanding, the first identifier corresponding to the first access network slice may also be considered as an area identifier. To be specific, coverage areas of access network devices that broadcast a same first identifier are considered as one area, and the area may support at least one same network slice. In the second understanding, the first identifier corresponding to the first network slice may also be considered as the access network slice identifier. Therefore, it may be understood that the access network device may broadcast one first identifier, or may broadcast a plurality of first identifiers. This is not limited herein. Each first identifier corresponds to one network slice set (where one network slice set includes at least one network slice), and network slice sets corresponding to different first identifiers broadcast by a same access network device are different. For example, a base station 1 broadcasts the first identifier #1, and the first identifier #1 corresponds to a network slice set #1 (where the network slice set #1 includes network slices #1 and #2). The base station 1 further broadcasts the first identifier #2, and the first identifier #2 corresponds to a network slice set #2 (where the network slice set #2 includes a network slice #3). It can be learned that the network slice set #1 and the network slice set #2 include different network slices.

Alternatively, that "the first identifier identifies information about a first access network slice" may indirectly reflect the area information of the access network slice in which the first access network device is located, for example, in a TA range, an area range that is formed by a plurality of access network devices that broadcast the first identifier and that is smaller than a TA granularity. One TA range may be divided into a plurality of slice areas, and each slice area supports a different network slice. The access network devices that broadcast a same first identifier support a same network slice list. For example, if both the base station 1 and a base station 2 broadcast the first identifier #1, and a base station 3 to a base station 6 all broadcast the first identifier #2, it indicates that the base station 1 and the base station 2 are located in a same access network slice area #1, and the base stations 3 to 6 are located in a same access network slice area #2.

Optionally, the first identifier may be a RAN slice area identifier (SA ID), or may be an extended meaning of an ID in an existing standard. For example, the first identifier is a RAN area code (RANAC) identifier or a cell access group (CAG) identifier.

S220: The first access network device sends a radio resource control (RRC) message to a terminal device, where the RRC message includes information about at least one first network slice corresponding to the first identifier. Correspondingly, the terminal device receives the RRC message from the first access network device.

The information about the at least one first network slice corresponding to the first identifier may be obtained in different implementations. Optionally, the information about the at least one first network slice corresponding to the first identifier may be sent by an operation, administration and maintenance (OAM) to the first access network device and a core network element. Alternatively, optionally, the first identifier and the information about the at least one first network slice corresponding to the first identifier may be allocated by the core network element to the first access network device. Alternatively, optionally, the first access network device sends information about at least one supported first network slice to the core network element, and then obtains the first identifier allocated by the core network element. Optionally, the correspondence between the first identifier and the information about the at least one network slice may remain unchanged in a tracking area TA range. Alternatively, the correspondence between a PLMN ID, the first identifier, and the information about the at least one network slice may remain unchanged in a tracking area TA range. In this way, after the terminal device moves within the TA range, the terminal device obtains the first identifier from a broadcast message of a third access network device (where the third access network device may be understood as an access network device in which the terminal device is located after movement). The terminal device finds, through detection, that the mapping relationship between the first identifier and the information about the at least one first network slice has been obtained before, to determine information about at least one network slice supported by the third access network device.

A sequence of "determining, by the terminal device, whether the first access network device and the third access network device are in a same TA range" and "determining, by the terminal device, whether the information about the at least one network slice corresponding to the first identifier broadcast by the third access device is obtained" is not limited in this embodiment of this application.

Optionally, in an implementation, before the terminal device detects whether the mapping relationship is obtained, that is, before the terminal device determines whether the information about the at least one network slice corresponding to the first identifier broadcast by the third access device is obtained, the terminal device may first determine whether the first access network device and the third access network device are in a same TA range. Optionally, the terminal device may determine, by determining whether a tracking area code (TAC) broadcast by the first access network device is the same as a TAC broadcast by the third access network device, whether the first access network device and the third access network device are located in the same TA range. If the TACs broadcast by the first access network device and the third access network device are the same, it indicates that the first access network device and the third access network device are located in the same TA range; if the TACs broadcast by the first access network device and the third access network device are different, it indicates that the first access network device and the third access network device are located in different TA ranges. Alternatively, the terminal device may determine, by determining whether a combination of a PLMN ID and the TAC broadcast by the first access network device is the same as a combination of a PLMN ID and the TAC broadcast by the third access network device, whether the first access network device and the third access network device are located in the same TA range. If the combination of the PLMN ID and the TAC broadcast by the first access network device and the combination of the PLMN ID and the TAC broadcast by the third access network device are the same, it indicates that the first access network device and the third access network device are located in the same TA range; if the combination of the PLMN ID and the TAC broadcast by the first access network device and the combination of the PLMN ID and the TAC broadcast by the third access network device are different, it indicates that the first access network device and the third access network device are located in different TA ranges. If the first access network device and the third access network device are located in the same TA range, the terminal device then detects whether the mapping relationship is obtained. When the first access network device and the third access network device are located in the same TA range, if the mapping relationship is obtained, the terminal device does not need to re-obtain the mapping relationship between the first identifier and the information about the at least one first network slice; or if the mapping relationship is not obtained, the terminal device needs to apply to the third access network device for obtaining the mapping relationship. If the first access network device and the third access network device do not belong to the same TA range, the terminal device needs to re-obtain the mapping relationship. For example, the terminal device accesses the third access network device, and sends a request to the third access network device, to request the third access network device to send the mapping relationship between the first identifier and the information about the at least one first network slice to the terminal device.

Alternatively, optionally, in an implementation, the terminal device first detects whether the mapping relationship is obtained, that is, the terminal device determines whether the information about the at least one network slice corresponding to the first identifier broadcast by the third access device is obtained. If the mapping relationship is obtained, the terminal device then determines whether the first access network device and the third access network device are in the same TA range; if the mapping relationship is not obtained, the terminal device needs to apply to the third access network device for obtaining the mapping relationship. When the mapping relationship is obtained, if the first access network device and the third access network device are located in the same TA range, the terminal device does not need to re-obtain the mapping relationship; if the first access network device and the third access network device do not belong to the same TA range, the terminal device needs to apply to the third access network device for obtaining the mapping relationship. Herein, if the first access network device and the third access network device do not belong to the same TA range, even if both the first access network device and the third access network device broadcast the first identifier, the information about the at least one network slice corresponding to the first identifier broadcast by the first access network device may be different from the information about the at least one network slice corresponding to the first identifier broadcast by the third access network device. Therefore, the terminal device needs to re-obtain the mapping relationship from the third access network device.

The at least one first network slice may be understood as a network slice list (or a network slice set) supported by or corresponding to the first identifier. The slice list includes information about at least one network slice. Herein, unified descriptions are provided. Information about a network slice (for example, the first network slice or a second network slice that appears below) in embodiments of this application may be identified by using single network slice selection assistance information (S-NSSAI), a slice/service type (SST), or a slice index, or may be identified by using a slice identifier that can be identified by the terminal device. This is not limited.

The RRC message may include a slice list corresponding to the first identifier. Optionally, the RRC message may further include the first identifier. In other words, the RRC message may include a mapping relationship (or a correspondence) between the first identifier and the slice list. For example, the RRC message includes at least one first identifier and at least one network slice identifier corresponding to the at least one first identifier.

Optionally, the RRC message may further include a network slice index corresponding to each first network slice. For example, S-NSSAI requires 32 bits. However, if an access network device or a cell supports only four slices, a slice index needs only 2 bits to indicate the four slices, so that broadcast overheads are further greatly reduced.

For example, information elements that may be included in the RRC message are shown as follows:
RSA ID
slice list
  S-NSSAI
  slice index (optional)

For another example, the information elements (information elements, IEs) that may be included in the RRC message are shown as follows:
RSA ID List
  RSA ID
  slice list
    S-NSSAI
    slice index (optional)

It may be understood that the slice index included in the RRC message may be optional. An implementation in which the first access network device sends the information about the at least one first network slice corresponding to the first identifier by using the RRC message is described above. Optionally, the first access network device may send, by using a media access control control element (MAC CE) message, a broadcast message, a non-access stratum (NAS) message, a message 1 or a message 3 in a random access procedure, or the like, the information about the at least one first network slice corresponding to the first identifier. This is not limited herein.

Optionally, the first access network device may send, to the core network element, the information about the at least one first network slice corresponding to the first identifier. For example, if reported content is at a gNB level, the first access network device may directly add the network slice list (the information about the at least one first network slice) corresponding to the first identifier to an NG interface message (for example, an NG interface setup request or a RAN configuration update message). Optionally, the NG interface message further includes the first identifier. If the reported content is at a cell level, the first access network device adds a cell identifier and a network slice list corresponding to the cell identifier to the NG interface message. Optionally, the NG interface message further includes the first identifier. NG interfaces are classified into NG-C interfaces (e.g., control plane interfaces between an NG-RAN and a 5GC) and NG-U interfaces (e.g., user plane interfaces between the NG-RAN and the 5GC). The NG interface message is a message transmitted over the NG-C interface.

Optionally, the first access network device may also learn of an RSA ID and a slice list that correspond to a neighboring base station (for example, the neighboring base station is a second access network device). For example, assuming that the first access network device and the second access network device are connected through an Xn interface, the first access network device and the second access network device may exchange respective corresponding RSA IDs and slice lists by using an Xn interface message (for example, an Xn interface setup request, an Xn interface setup reply, or an NG-RAN NODE CONFIGURATION UPDATE). For example, the first access network device sends the Xn interface message to the second access network device, where the Xn interface message includes the first identifier and the information about the at least one network slice. Similarly, the first access network device may obtain, by using the Xn interface message, the RSA ID and the slice list that correspond to the neighboring base station. Optionally, after the first access network device obtains, by using the foregoing method, the RSA ID and the slice list that correspond to the neighboring base station, the first access network device may send the RSA ID and the slice list that correspond to the neighboring base station to the core network element. For the core network element, regardless of whether the RSA ID and the slice list that correspond to the access network device are reported by the access network device or configured by using the OAM, the core network element may receive RSA IDs and slice lists of all access network devices in a TA range. For example, the core network element may learn of, through reporting by all access network devices in the TA range, RSA IDs and slice lists corresponding to all the access network devices in the TA range. Optionally, the core network element may send a mapping relationship between the RSA ID and the slice list to the terminal device by using a NAS message, for example, send the mapping relationship between the RSA ID and the slice list to the terminal device by using the NAS message such as a Registration Accept or a UE configuration Update command.

In this embodiment of this application, the first access network device broadcasts the first identifier, and sends, by using the RRC message, the information about the at least one first network slice corresponding to the first identifier, to reduce broadcast overheads of the first access network device. For example, it is considered that the mapping relationship between the first identifier and the at least one first network slice remains unchanged in the TA range. In a special case, for example, the first identifier is in a one-to-one correspondence with the first network slice, 256 first network slices in the TA range can be identified by using 8 bits. Therefore, the broadcast overheads of the first access network device are greatly reduced.

Figure 3:
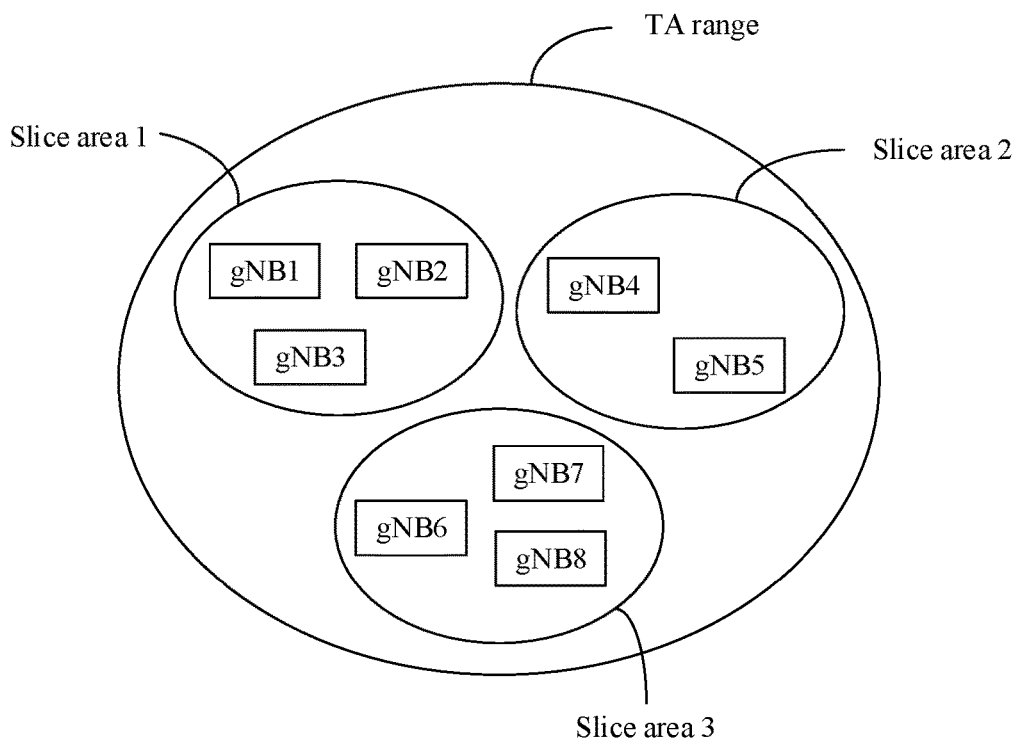
FIG. 3 is a schematic diagram of a slice area according to an embodiment of this application.

For ease of understanding, an example in FIG. 3 is used herein to describe the slice area. As shown in FIG. 3, it is assumed that a TA range includes three slice areas (or referred to as RSAs): a slice area 1, a slice area 2, and a slice area 3. Slice lists supported by different slice areas may be completely different, or may partially overlap. A gNB1, a gNB2, and a gNB3 are located in the slice area 1; a gNB4 and a gNB5 are located in the slice area 2; and a gNB6, a gNB7, and a gNB8 are located in the slice area 3. For example, the slice area 1 supports a slice #1 and a slice #2, the slice area 2 supports a slice #3 and a slice #4, and the slice area 3 supports the slice #1, a slice #5, and a slice #6. A network slice supported by one TA area is formed by a union set of network slice lists supported by a plurality of slice areas. For the slice area, access network devices or cells in one slice area support a same network slice.

Figure 4:
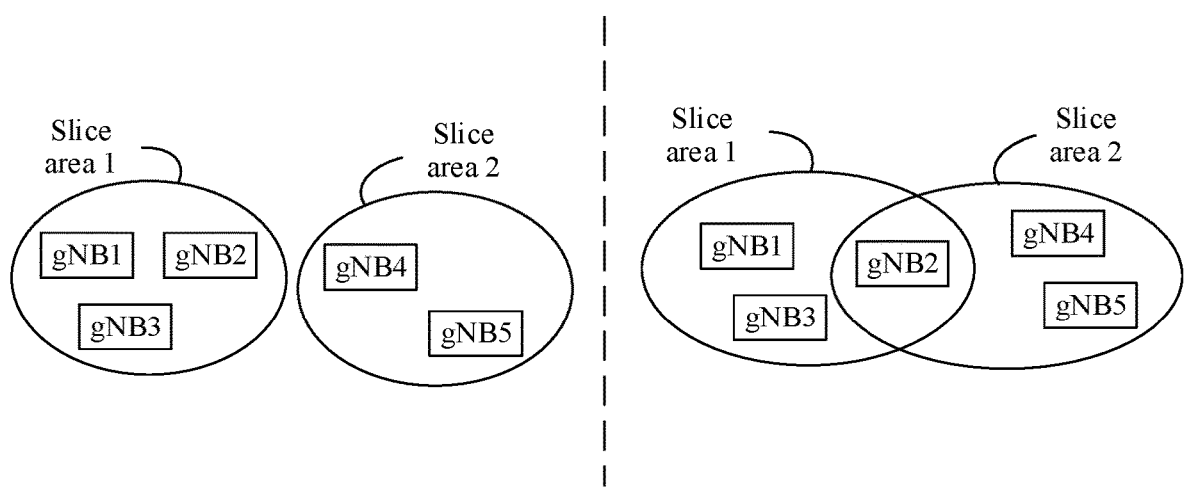
FIG. 4 is another schematic diagram of a slice area according to an embodiment of this application.

In a possible implementation, there is no overlapping access network device or cell between different slice areas. The left figure in FIG. 4 is used as an example. A gNB1, a gNB2, and a gNB3 in a slice area 1 support a slice #1 and a slice #2, and a gNB4 and a gNB5 in a slice area 2 support a slice #3 and a slice #4.

In another possible implementation, there is an overlapping access network device or cell between different slice areas. The right figure in FIG. 4 is used as an example. A gNB1, a gNB2, and a gNB3 in a slice area 1 support a slice #1, and the gNB2, a gNB4, and a gNB5 in a slice area 2 support a slice #2. It can be learned that the gNB2 supports both the slice #1 and the slice #2, and therefore falls within ranges of both the slice area 1 and the slice area 2.

A specific scenario of the slicing area is not limited in this embodiment of this application. In other words, the two cases in FIG. 3 and FIG. 4 are both applicable.

In this embodiment of this application, if the TA range is not divided into a plurality of areas, assuming that the mapping relationship supported by the access network device remains unchanged in the TA range, after obtaining the mapping relationship, the terminal device does not need to move in the TA range subsequently. In this embodiment of this application, if the TA range is divided into a plurality of areas (for example, the slice areas in FIG. 3 or the slice areas in FIG. 4), access network devices located in different areas support different network slices. It is assumed that the mapping relationship remains unchanged within the TA range. In this case, an access network device in an area needs to notify the terminal device of mapping relationships that may be disabled in all areas in the TA range. It can be implemented only in this way that, the terminal device already obtains the mapping relationships when moving within the TA range. The mapping relationship herein is a mapping relationship between the first identifier and the at least one first network slice, for example, a mapping relationship between an RSA ID and information about at least one slice.

The first access network device may actively send, to the terminal device, the information about the at least one first network slice corresponding to the first identifier, or may send the information to the terminal device based on a request of the terminal device. This is not limited herein.

Optionally, before the first access network device sends the RRC message to the terminal device, the method 200 further includes:

S230: The terminal device sends a request message to the first access network device, where the request message requests the information about the at least one first network slice corresponding to the first identifier. Correspondingly, the first access network device receives the request message from the terminal device.

The request message indicates that the terminal device expects to obtain the information about the at least one first network slice corresponding to the first identifier, for example, a mapping relationship between an RSA ID and a slice list. A form of the request message is not limited herein. For example, the request message may be an RRC message. For another example, the request message may be a MAC layer message such as a newly defined MAC CE. For another example, the request message may be an indication newly added to an uplink RRC message. Optionally, the request message of the terminal device may include at least one first identifier, that is, request information about a network slice corresponding to each of the at least one first identifier. For example, the first access network device broadcasts a first identifier #1, a first identifier #2, and a first identifier #3, but the terminal device expects to obtain only information about at least one network slice respectively corresponding to the first identifier #1 and the first identifier #2. In this case, the terminal device adds the first identifier #1 and the first identifier #2 to the request message, so that the first access network device separately provides, in the RRC message, the information about the at least one network slice corresponding to the first identifier #1 and the information about the at least one network slice corresponding to the first identifier #2.

Figure 5:
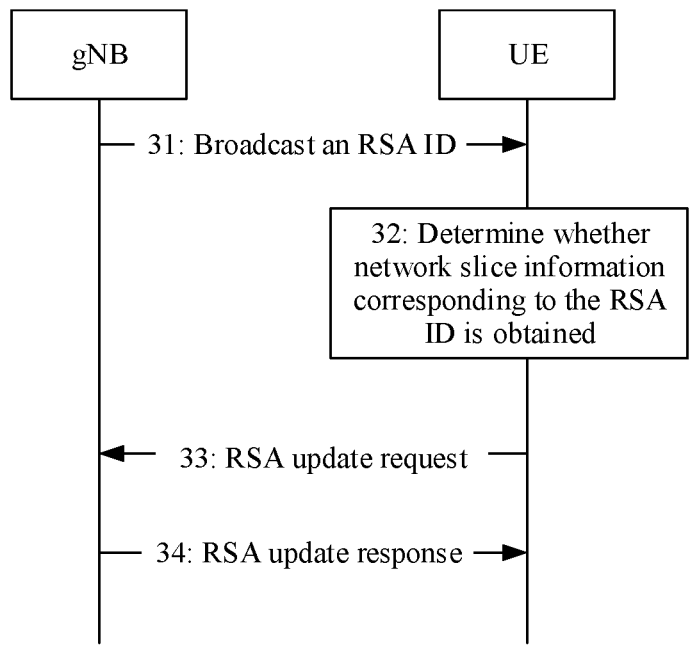
FIG. 5 is a schematic interaction diagram of a communication method according to an embodiment of this application.

If the terminal device moves, the terminal device may not recognize the first identifier. Consequently, the terminal device cannot learn of the information about the at least one first network slice corresponding to the first identifier. Alternatively, although the terminal device recognizes the first identifier, the terminal device updates a tracking area. In this case, the mapping relationship between the first identifier and the information about the at least one network slice may change. The terminal device may obtain the information about the at least one first network slice corresponding to the first identifier by sending the request message to the first access network device. For example, the first identifier is an RSA ID. When the terminal device finds that information about at least one first network slice corresponding to the RSA ID is not stored (for example, an AS layer of the terminal device compares a previously stored RSA ID with the RSA ID obtained from a broadcast message of the first access network device), the terminal device may trigger sending of an uplink RRC message (for example, an RSA update request) to the first access network device. The first access network device may send, to the terminal device in a downlink RRC message (for example, an RSA update response), a slice list corresponding to the RSA ID, or send the RSA ID and the corresponding slice list to the terminal device. Herein, an RSA update procedure in FIG. 5 is introduced for description. An example in which the first access network device is a gNB, the terminal device is UE, the uplink RRC message is an RSA update request, and the downlink RRC message is an RSA update response is used for description. As shown in FIG. 5, the RSA update procedure 300 includes the following steps.

31: The gNB broadcasts an RSA ID. The UE obtains the RSA ID broadcast by the gNB.

32: The UE determines whether network slice information (for example, a slice list) corresponding to the RSA ID is obtained.

In other words, the UE may detect whether a mapping relationship (for example, a mapping relationship between the RSA ID and a slice list) of the RSA ID is obtained. For example, the UE may detect whether a slice list corresponding to the RSA ID is obtained. For another example, the UE may detect whether a slice list corresponding to the RSA ID and slice indexes of all slices in the slice list are obtained.

Step 32 may include the following different cases. The base station 2 in the following cases is corresponding to the gNB in step 31.

In a possible case 1, assuming that there is a mapping relationship between an RSA ID and a network slice identifier, and the mapping relationship is unique in an entire network, the UE only needs to detect whether the mapping relationship between the RSA ID and the network slice identifier is obtained. For example, the UE reads an RSA ID broadcast by a base station 1, and obtains a mapping relationship between the RSA ID and a network slice identifier. The UE stores the mapping relationship between the RSA ID and the network slice identifier. Subsequently, after moving to a base station 2, the UE determines, based on an RSA ID broadcast by the base station 2 and a mapping relationship that is between the RSA ID and the network slice and that is stored in the UE, whether a mapping relationship between the RSA ID and the network slice is obtained.

In a possible case 2, assuming that there is a mapping relationship between a PLMN ID, an RSA ID, and a network slice identifier, and the mapping relationship is unique in an entire network, the UE needs to detect whether a mapping relationship that is between the RSA ID and the network slice and that is in the PLMN ID is obtained. For example, the UE reads a PLMN ID and a corresponding RSA ID that are broadcast by the base station 1, and obtains a mapping relationship between the PLMN ID, the RSA ID, and a network slice identifier. The UE stores the mapping relationship between the PLMN ID, the RSA ID, and a network slice. Subsequently, after moving to the base station 2, the UE determines, based on a PLMN ID and an RSA ID that are broadcast by the base station 2 and a mapping relationship that is between the PLMN ID, the RSA ID, and the network slice and that is stored in the UE, whether a mapping relationship that is between the RSA ID and the network slice and that is in the PLMN is obtained.

In a possible case 3, assuming that there is a mapping relationship between an RSA ID and a network slice, and the mapping relationship is unique in a TA range, the UE needs to detect whether the mapping relationship that is between the RSA ID and the network slice and that is in the TA is obtained. For example, the UE reads a TAC and an RSA ID that are broadcast by the base station 1, and obtains a mapping relationship between the RSA ID and a network slice identifier. The UE stores a mapping relationship between the TAC, the RSA ID, and a network slice. Subsequently, after moving to the base station 2, the UE determines, based on a TAC and an RSA ID that are broadcast by the base station 2 and a mapping relationship that is between the TAC, the RSA ID, and the network slice and that is stored in the UE, whether a mapping relationship that is between the RSA ID and the network slice and that is in the TAC is obtained.

In a possible case 4, assuming that there is a mapping relationship between a PLMN ID, an RSA ID, and a network slice identifier, and the mapping relationship is unique in a TA range, the UE needs to detect whether a mapping relationship that is between the RSA ID and the network slice and that is in the TA and in the PLMN ID is obtained. For example, the UE reads a PLMN ID, a TAC, and an RSA ID that are broadcast by the base station 1, and obtains a mapping relationship between the PLMN ID, the RSA ID, and a network slice identifier. The UE stores a mapping relationship between the PLMN ID, the TAC, the RSA ID, and a network slice. Subsequently, after moving to the base station 2, the UE determines, based on a PLMN ID, a TAC, and an RSA ID that are broadcast by the base station 2 and a mapping relationship that is between the PLMN ID, the TAC, the RSA ID, and the network slice and that is stored in the UE, whether a mapping relationship that is between the RSA ID and the network slice and that is in the TA and in the PLMN is obtained.

If the UE does not detect network slice information corresponding to the RSA ID, the UE may perform step 33.

33: The UE sends an RSA update request to the gNB.

The UE sends the RSA update request to the gNB, to request the network slice information corresponding to the RSA ID.

34: The gNB sends an RSA update response to the UE.

The gNB may add the network slice information corresponding to the RSA ID to the RSA update response.

It may be understood that the RSA update procedure in FIG. 5 is merely used as an example for description herein, and does not constitute any limitation on the protection scope of embodiments of this application.

In addition, a trigger condition for sending the request message by the terminal device is not limited herein either. For example, as described above, when finding that information about at least one first network slice corresponding to the RSA ID is not stored, the terminal device may send the request message to the first access network device. Specifically, for example, when initiating a tracking area update (TAU) procedure (for example, a NAS message Tracking Area Update request), an attach procedure, a registration procedure (for example, a NAS message Registration Request), or a PDU session establishment request (for example, a NAS message PDU Session Establishment request), the terminal device may need to read the RSA ID broadcast by the access network device. If the terminal device finds that the slice list (or referred to as a mapping relationship between the RSA ID and the slice list) corresponding to the RSA ID is not stored, a NAS stratum of the terminal device notifies an AS stratum that the mapping relationship between the RSA ID and the slice list needs to be obtained. Alternatively, the NAS stratum of the terminal device notifies the AS stratum of a target network slice identifier. If the AS stratum of the terminal device determines that an RSA ID corresponding to the target network slice identifier cannot be found, the AS stratum determines that the mapping relationship between the RSA ID and the slice list needs to be obtained. Alternatively, if the terminal device finds, by reading the RSA ID broadcast by the access network device, that the mapping relationship between the RSA ID and the slice list is not stored, the terminal device determines that the mapping relationship between the RSA ID and the slice list needs to be obtained. In this case, when sending the NAS message, the terminal device may add the request message to an RRC message (or a MAC CE or other signaling).

The foregoing is described with reference to the RSA update procedure in FIG. 5. For example, for an RRC inactive (inactive) mode, an existing RRCResumeRequest message may be reused to implement the RSA update procedure. For example, if the terminal device finds that an RANAC changes, the terminal device triggers an RRC layer to generate the RRCResumeRequest message, and a cause value included in the RRC resume request (RRCResumeRequest) message is RSA update. When the first access network device finds that the cause value is the RSA update, the first access network device subsequently adds the first identifier and at least one corresponding network slice identifier to the RRC message. Herein, descriptions are provided with reference to an RSA update procedure 400 corresponding to the RRC inactive mode in FIG. 6.

Figure 6:
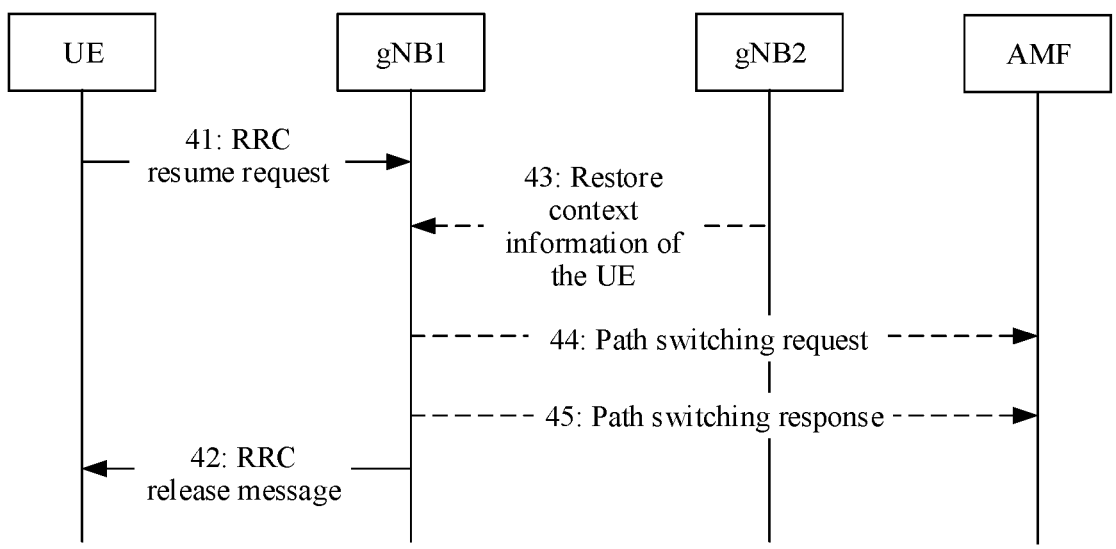
FIG. 6 is another schematic interaction diagram of a communication method according to an embodiment of this application.

An example in which the terminal device is UE and the first access network device is a gNB1 is used for description. As shown in FIG. 6, the RSA update procedure corresponding to the RRC inactive mode includes the following steps.

41: The UE sends an RRCResumeRequest to the gNB1.

The RRCResumeRequest includes a cause value RSA update, indicating that network slice information (for example, a mapping relationship between an RSA ID and a slice list, where for specific descriptions, refer to the foregoing descriptions in step 32) corresponding to the RSA ID needs to be updated.

42: The gNB1 sends an RRC release (RRCRelease) message to the UE.

The RRCRelease includes the mapping relationship between the RSA ID and the slice list, for example, an RSA ID and a slice list supported by the RSA ID.

Optionally, when finding that the cause value in the RRCResumeRequest is the RSA update, the gNB1 may trigger steps 43 to 45, or may not trigger steps 43 to 45. This specifically depends on implementation of the gNB1, and is not specifically limited.

43: The gNB1 and a gNB2 restore context information of the UE through interaction. The gNB2 is a base station that serves the UE before the UE moves, and may be referred to as a last serving base station (last serving gNB). Alternatively, the gNB2 is an anchor base station (anchor gNB) that stores a context of the UE.

44: The gNB1 sends a path switching request to an access management function (AMF).

45: The AMF sends a path switching response to the gNB1.

It may be understood that the RSA update procedure corresponding to the RRC inactive mode in FIG. 6 is merely used as an example for description herein, and does not constitute any limitation on the protection scope of embodiments of this application.

In this embodiment of this application, the first identifier may be used for admission control. For example, the RSA ID, the RANAC, or the CAG identifier may be further used for admission control. The RSA ID is used as an example for description. It is assumed that the terminal device is preconfigured with an RSA ID that allows access (which may be an allowed RSA list configured by the core network element for the terminal device by using a NAS message, or configured by the first access network device for the terminal device by using an RRC message, for example, by using an RRC reconfiguration message or an RRCRelease message). In this case, after arriving at a new cell, the terminal device determines whether an RSA ID broadcast by the cell belongs to the RSA list that allows access. If the RSA ID broadcast by the cell belongs to the RSA list that allows access, the terminal device may access the cell; if the RSA ID broadcast by the cell does not belong to the RSA list that allows access, the terminal device cannot access the cell. In addition, the first access network device may further configure a mapping relationship between the RSA ID and an access category (AC), a mapping relationship between S-NSSAI and the access category AC, or a mapping relationship between the RSA ID, the S-NSSAI, and the access category AC. Alternatively, these mapping relationships may be defined by an operator, and are configured for the terminal device before delivery. Alternatively, these mapping relationships are notified by the core network element (for example, the AMF) to the terminal device by using a NAS layer message. The terminal device may find a corresponding AC based on S-NSSAI (for example, a mapping relationship that is between an application (APP) ID and the S-NSSAI and that is provided in a NAS message) corresponding to a service and/or an RSA ID broadcast by a current cell, to determine, based on an access control parameter that is corresponding to the AC and that is broadcast by the access network device, whether the current cell can be accessed. The access control parameter corresponding to the AC is also referred to as unified access control (UAC).

Optionally, the terminal device may alternatively determine, based on a target network slice identifier and a mapping relationship between the first identifier and at least one network slice, whether a current access network device supports the target network slice identifier. If the current access network device supports the target network slice identifier, the terminal device may attempt to access the current access network device. If the current access network device does not support the target network slice identifier, the terminal device may choose to access another access network device. It may be understood that a relationship between the current access network device and the first access network device is not limited herein. The current access network device may be the first access network device, or may not be the first access network device. This is not specifically limited.

In this embodiment of this application, access network devices may exchange identifiers and information about network slices corresponding to the identifiers that are broadcast by the access network devices. In other words, the first access network device may obtain an identifier and information about the network slice corresponding to the identifier that are broadcast by a neighboring base station or a neighboring cell, and may send the first identifier and the information about the at least one first network slice corresponding to the first identifier to the neighboring base station.

Optionally, the method 200 further includes the following.

S240: The second access network device sends a first message to the first access network device, where the first message includes a second identifier and information about at least one second network slice corresponding to the second identifier. Correspondingly, the first access network device receives the first message from the second access network device. The second identifier identifies information about a second access network slice. The foregoing describes a case that the first access network device and the second access network device may interact with each other by using the Xn interface message. For example, the first message herein may be an Xn interface message, and the Xn interface message may include an RSA ID and a slice list that correspond to the second access device.

The second access network device and the first access network device may be neighboring base stations of each other. The second access network device and the first access network device may exchange identifiers and information about network slices corresponding to the identifiers that are broadcast by the second access network device and the first access network device.

It may be understood that the second identifier is introduced herein only to represent a slice area corresponding to the second access network device, for example, the information about the second access network slice, and has no other special meaning. The "first identifier" and the "second identifier" are introduced in embodiments of this application to distinguish between information about access network slices respectively identified by the "first identifier" and the "second identifier". For descriptions of the second identifier, refer to the foregoing descriptions of the first identifier.

After obtaining the foregoing information of the second access network device, the first access network device may notify the terminal device of the foregoing information. In this way, after moving into coverage of a second access network device, the terminal device may no longer need to request, from the second access network device, the information about the at least one second network slice corresponding to the second identifier. Optionally, the RRC message sent by the first access network device to the terminal device may further include the second identifier and the information about the at least one second network slice corresponding to the second identifier. In this way, the terminal device may obtain, in advance, the information that is about the at least one second network slice corresponding to the second identifier and that is of the second access network device, to reduce a procedure in which the terminal device triggers an application for the information about the at least one second network slice corresponding to the second identifier, and help reduce power consumption of the terminal device.

It may be understood that whether the first access network device and the second access network device belong to a same slice area is not limited in this embodiment of this application. The first access network device and the second access network device may belong to the same slice area, that is, support corresponding network slices. In this case, the first identifier is the same as the second identifier, that is, information about the first access network slice identified by the first identifier is the same as information about the second access network slice identified by the second identifier. Alternatively, network slices supported by the first access network device and the second access network device are partially the same or partially overlap. In other words, some network slices in the "at least one first network slice" are the same as some network slices in the "at least one second network slice". Alternatively, the first access network device and the second access network device may not belong to a same slice area, but the terminal device may learn, from the first access network device in advance, the second identifier and the information about the at least one second network slice corresponding to the second identifier.

This application further provides a communication method. When receiving a paging message, the terminal device may compare network slice information included in the paging message with network slice information supported by a current cell. If the current cell does not support the network slice, the terminal device may trigger cell reselection. Details are described below.

Figure 7:
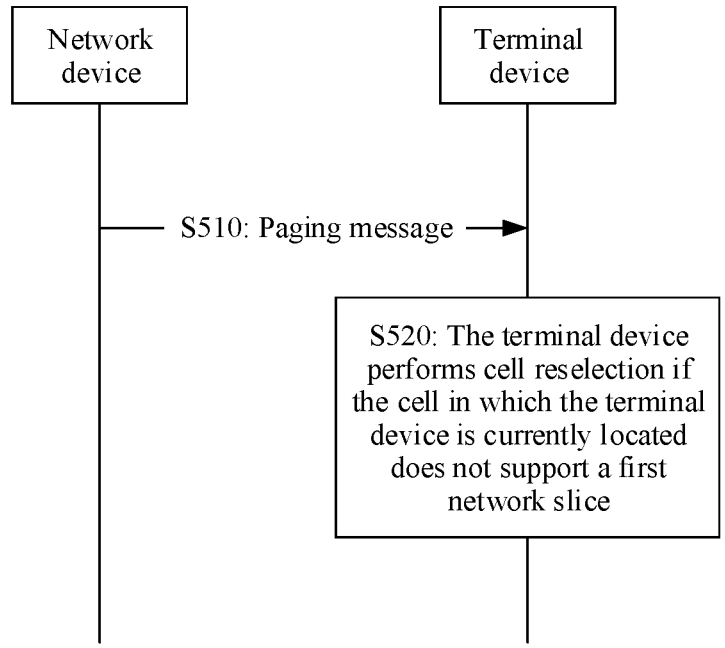
FIG. 7 is a schematic flowchart of another communication method according to an embodiment of this application.

FIG. 7 is a schematic interaction diagram of another communication method 500 according to an embodiment of this application. It may be understood that a terminal device in FIG. 7 may be the terminal device (for example, the terminal device 130 or the terminal device 140) in FIG. 1, or may be an apparatus (for example, a processor, a chip, or a chip system) in the terminal device. The network device may be the access network device 120 in FIG. 1, or may be an apparatus (for example, a processor, a chip, or a chip system) in the access network device. Alternatively, the network device may be the core network device 110 in FIG. 1, or may be an apparatus (for example, a processor, a chip, or a chip system) in the core network device. It may be further understood that some or all information exchanged between the terminal device and the network device in FIG. 7 may be carried in an existing message, channel, or signal, or existing signaling, or may be a newly defined message, channel, or signal, or newly defined signaling. This is not specifically limited. As shown in FIG. 7, the method 500 includes the following steps.

S510: The terminal device receives a paging message from a network device, where the paging message includes information about a first network slice. For example, the information about the first network slice may include at least one of S-NSSAI and an SST, or may be an identifier of another network slice known to the terminal device, an access network device, and a core network element.

The network device may be an access network device or a core network element. This is not limited herein. For example, a core network element sends the paging message to an access network device. The terminal device receives a paging message sent by the core network element by using the access network device, where the access network device is responsible for managing a cell in which the terminal device is currently located.

After obtaining the paging message, the terminal device may compare information about a network slice supported by the cell in which the terminal device is currently located (or information about a network slice supported by the access network device) with the information about the first network slice included in the paging message, to determine whether the cell in which the terminal device is currently located supports the first network slice.

S520: The terminal device performs cell reselection if the cell in which the terminal device is currently located does not support the first network slice.

If the cell in which the terminal device is currently located supports the first network slice in the paging message, the terminal device may send a ue-Identity and an accessType to a higher layer, namely, a NAS layer. If the cell in which the terminal device is currently located does not support the first network slice in the paging message, the terminal device is triggered to perform cell reselection.

Optionally, when determining that the access network device does not support the first network slice in the paging message, the access network device may add, to the paging message, a list of cells supporting the first network slice, an RSA ID supporting the first network slice, another cell identifier or a carrier identifier supporting the first network slice, or the like, so that the terminal device can purposefully perform cell reselection. In this way, the terminal device may perform cell reselection by using the list of cells supporting the first network slice (or the RSA ID supporting the first network slice, the carrier identifier supporting the first network slice, or the like) that is provided in the paging message, or perform cell reselection by using a cell supporting the RSA ID of the first network slice provided in the paging message.

When the terminal device cannot find a cell or an access network device that supports the first network slice in the paging message, if the terminal device has received a first mapping relationship obtained through network slice remapping, the terminal device may perform cell reselection by using the first mapping relationship. The network slice remapping means that when the terminal device expects to initiate a service associated with the first network slice, the terminal device or the network device (where the network device may include the access network device or the core network element) may support, by using a network resource of a second network slice that has a remapping relationship with the first network slice, the service associated with the first network slice. For example, the terminal device expects to support a service associated with a network slice #1, but cannot find an access network device supporting the network slice #1. It is assumed that there is a network slice remapping relationship between the network slice #1 and the network slice #2. In this case, the terminal device may find a cell or an access network device supporting the network slice #2, and initiates the service associated with the network slice #1. The first mapping relationship may be obtained by the terminal device from the core network element or the access network device. For example, when the terminal device registers with a core network, the core network element sends the first mapping relationship to the terminal device by using a NAS message (for example, a Registration Accept or a UE Configuration update command). For example, when delivering the paging message, the access network device adds the first mapping relationship to the paging message.

The first mapping relationship represents a mapping relationship between network slices. Certainly, the first mapping relationship may have another name. This is not limited herein. The first mapping relationship may be understood as a network slice remapping list. For example, the Slice remapping list may include the following information elements: a slice ID and a remapped slice identifier.

For example, the network slice remapping list may be shown as follows:
Slice List
    slice ID
        remapped slice list (the list includes at least one remapped slice ID)
            remapped slice ID Optionally, the first mapping relationship further includes PLMN information. For example, a possible form of the network slice remapping list is shown as follows:
PLMN List
    PLMN ID
    Slice list
        slice ID
            remapped slice list
                remapped slice ID It may be understood that the foregoing examples of information elements are merely examples for description, and do not constitute any limitation on this embodiment of this application.

In a possible implementation, optionally, that the terminal device performs cell reselection includes: The terminal device performs cell reselection based on a first mapping relationship, where the first mapping relationship includes the information about the first network slice and information about a second network slice, and there is a remapping relationship between the information about the first network slice and the information about the second network slice. In other words, the terminal device may perform cell reselection by using two network slices having a remapping relationship. If the cell in which the terminal device is located does not support the first network slice, the terminal device may perform cell reselection by using a second network slice that has a remapping relationship with the first network slice.

The information about the first network slice may include an ID, an index, a SST/S-NSSAI, or the like of the first network slice device. Similarly, the information about the second network slice may include an ID, an index, a SST/S-NSSAI, or the like of the second network slice device. For example, assuming that the information about the first network slice is a slice ID, the information about the second network slice may be a remapped slice ID.

Optionally, that the terminal device performs cell reselection based on the first mapping relationship includes: if the cell in which the terminal device is currently located supports the second network slice, the terminal device initiates a random access procedure in the cell in which the terminal device is currently located; or if the cell in which the terminal device is currently located does not support the second network slice, the terminal device selects a cell that supports the second network slice.

For example, if the cell in which the terminal device is currently located supports the second network slice, the terminal device may initiate the random access procedure in the cell in which the terminal device is currently located. For the random access initiation procedure, refer to an existing standardized procedure. If the cell in which the terminal device is currently located does not support the second network slice, the terminal device may select a cell that supports the second network slice. For example, the terminal device determines whether a surrounding neighboring cell supports the second network slice. If there is a cell that supports the second network slice, the terminal device selects, based on a cell reselection criterion, the cell that supports the second network slice.

In a possible implementation, if the terminal device finds the cell that supports the second network slice, the terminal device may notify the access network device or the core network element of the information about the second network slice. Optionally, if the terminal device selects the cell that supports the second network slice, the method 500 further includes: The terminal device sends a second message to a network device (an access network device or a core network element), where the second message includes the information about the first network slice and the information about the second network slice, or the second message includes the information about the second network slice. For example, the second message includes a remapped slice ID. For another example, the second message includes a slice ID and remapped slice ID.

For example, if the terminal device can find the remapped slice ID, the terminal device accesses the selected cell and notifies the current access network device of a target slice ID (namely, the slice ID included in the paging message) and the remapped slice ID. Optionally, when the current access network device forwards a NAS message (for example, a PDU Session Establishment Request message or a Service Request message) of the terminal device, the current access network device adds the target slice ID and/or the remapped slice ID to an NG interface message.

For example, the terminal device notifies the core network element of the remapped slice ID and the target slice ID by using a NAS message, so that the core network can find a corresponding QoS parameter based on the remapped slice ID.

In a possible implementation, if the terminal device fails to select a cell, the terminal device may notify the network device that the cell selection fails. A cell failure means that the terminal device cannot find a cell supporting a target network slice (namely, a network slice corresponding to a network slice identifier included in the paging message); or the terminal device cannot find a cell supporting a remapped slice after using a network slice remapping list; or the terminal device can find a cell supporting the target network slice (or find a cell supporting the remapped slice by using the network slice remapping list), but access to the cell is rejected. Optionally, the method 500 further includes: the terminal device sends a third message to a network device (an access network device or a core network element), where the third message notifies that the terminal device fails to select a cell. For example, if the terminal device fails to select the cell, the terminal device may notify the access network device or the core network element by using the third message. For example, the third message is a NAS message. Herein, that "the terminal device fails to select a cell" may include: the terminal device fails to select a cell by using the first mapping relationship.

Optionally, the method 500 further includes: the terminal device obtains information about a network slice supported by the cell in which the terminal device is currently located. Herein, for that the terminal device obtains information about a network slice supported by a cell in which the terminal device is currently located, refer to the description in the method 200.

Optionally, an action of "performing cell reselection by the terminal device" may be performed based on one or more of the following parameters: a quantity of cell access attempts, a timer, and the like. This is not limited herein. The foregoing parameters may be carried in a system broadcast message, or may be carried in a paging message, or may be carried in an RRC message. This is not limited herein. For example, a possible implementation of performing cell reselection based on the "quantity of cell access attempts" may be as follows: When a quantity of attempts made by the terminal device to access a cell supporting the target network slice reaches the "quantity of cell access attempts", and the cell access fails, the terminal device attempts to search for a cell supporting the remapped slice. For example, a possible implementation of performing cell reselection based on the "timer" may be as follows: Before a timer expires during cell access, the terminal device first attempts to search for a cell supporting the target network slice; and when the timer expires and no cell supporting the target network slice can be found, the terminal device attempts to search for a cell supporting the remapped slice.

This application further provides a communication method. Priority information of a network slice on a terminal device side is introduced, so that the terminal device may perform cell selection or cell reselection with reference to the priority information, to help select a more suitable cell. Alternatively, priorities of a network slice on an access network device side at different frequencies, or priorities of different network slices at different frequencies supported on an access network device side are introduced. The terminal device may perform cell selection or cell reselection with reference to the priority information. Details are described below.

Figure 8:
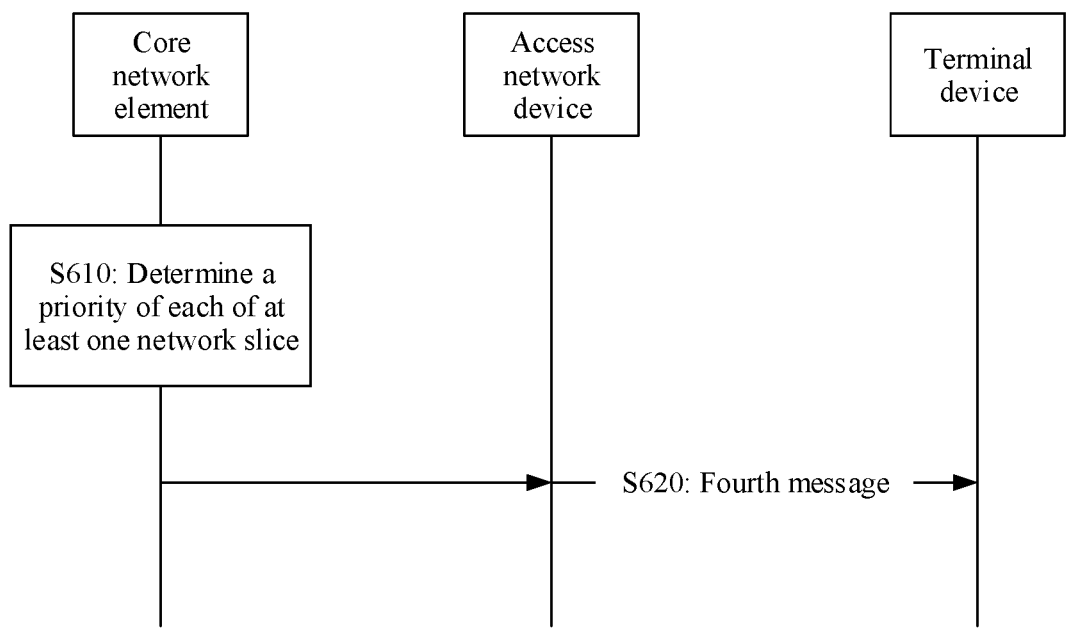
FIG. 8 is a schematic flowchart of still another communication method according to an embodiment of this application.

FIG. 8 is a schematic flowchart of still another communication method 600 according to an embodiment of this application. It may be understood that a terminal device in FIG. 8 may be the terminal device (for example, the terminal device 130 or the terminal device 140) in FIG. 1, or may be an apparatus (for example, a processor, a chip, or a chip system) in the terminal device. A core network element device may be the core network device 110 in FIG. 1, or may be an apparatus (for example, a processor, a chip, or a chip system) in the core network device. A first access network device may be the access network device 120 in FIG. 1, or an apparatus (for example, a processor, a chip, or a chip system) in the access network device. It may be further understood that some or all information exchanged between the core network device and the access network device (or the terminal device) in FIG. 8, or some or all information exchanged between the access network device and a terminal device may be carried in an existing message, channel, or signal, or existing signaling, or may be a newly defined message, channel, or signal, or newly defined signaling. This is not specifically limited. As shown in FIG. 8, the method 600 includes the following steps.

S610: The core network element determines a priority of each of at least one network slice.

The core network element may determine a corresponding priority for each network slice.

S620: The core network element sends a fourth message, where the fourth message includes an identifier of each network slice and the priority corresponding to each network slice.

Herein, the core network element may send the fourth message to the terminal device, or may send the fourth message to the terminal device by using the access network device. This is not limited herein. For example, the fourth message is a non-access stratum NAS message sent by the core network element to the terminal device.

For example, when sending allowed S-NSSAI to the terminal device by using the NAS message, the core network element may also provide a slice priority. Specific information elements are as follows:

Allowed S-NSSAIs
   S-NSSAI (or another slice identifier)
   priority priority

In this embodiment of this application, the terminal device obtains priority information of each of the at least one network slice.

Then, the terminal device performs cell selection or cell reselection based on the priority information of each network slice.

For the terminal device, the terminal device may obtain the priority information of the network slice in different manners. In a possible implementation, the terminal device associates an APP ID with S-NSSAI based on a network slice selection policy (NSSP) that may be included in a UE route selection policy (URSP) provided by the core network element. Then, the terminal device may sort priorities of network slices based on historical application (APP) usage. For example, S-NSSAI corresponding to an APP ID that has been used for a longest time is sorted as a highest priority, and so on, to finally determine priorities of the S-NSSAI. In still another possible implementation, the terminal device may directly obtain the priority information of each of the at least one network slice from the core network element.

After obtaining the priority information of the network slice, the terminal device may perform cell selection or cell reselection by using the priority information of the network slice.

In a possible implementation, if the terminal device is currently located in a first cell, that the terminal device performs cell selection or cell reselection based on the priority information of each network slice includes:

The terminal device selects a first network slice from the at least one network slice, where a priority of the first network slice is the highest in the at least one network slice. The terminal device determines whether the first cell supports the first network slice. When the first cell does not support the first network slice, the terminal device performs cell search to obtain a second cell, and determines whether the second cell supports the first network slice. Optionally, the terminal device may further determine whether a cell reselection condition (for example, a criterion S or a criterion R) is satisfied. When the second cell supports the first network slice, or when the second cell supports the first network slice, and satisfies the cell reselection condition, the terminal device adds the second cell to a candidate cell set, and continues to search and perform the foregoing actions until no new cell is found. When the candidate cell set is not empty, the terminal device selects to camp on a cell with the best signal (for example, highest receive power or highest signal strength) in the candidate cell set; or when the candidate cell set is empty, the terminal device selects a second network slice, and continues to perform cell search until a suitable cell is selected, where a priority of the second network slice is lower than the priority of the first network slice. When the first cell supports the first network slice, the terminal device continues to camp on the first cell.

The first cell is a cell on which the terminal device currently camps, and the terminal device preferably considers the first cell. Specifically, the terminal device selects a network slice with a highest priority based on the priority information. First, the terminal device determines whether the cell on which the terminal device currently camps supports the network slice with the highest priority (for example, the network slice supported by the cell on which the terminal device currently camps may be notified by the access network device by directly broadcasting supported S-NSSAI, or indirect using an RSA ID). If the cell on which the terminal device currently camps supports the network slice with the highest priority, the terminal device remains unchanged, that is, the terminal device still camps on the current cell. If the cell on which the terminal device currently camps does not support the network slice with the highest priority, the terminal device performs cell search. After finding a second cell (where for example, the cell meets a cell selection condition or a cell reselection condition, for example, a criterion S or a criterion R), the terminal device determines whether the second cell (where the second cell may be understood as a cell that is found by the terminal device and that meets the criterion S or the criterion R) supports the network slice with the highest priority. If the new cell found by the terminal device supports the network slice with the highest priority, the new cell is added to a candidate cell set. The terminal device continues searching and performing the foregoing actions until no new cell is found. If the candidate cell set is not empty, the terminal device selects a cell according to a cell reselection principle, for example, sorts cells in the candidate cell set according to the cell reselection criterion R, and then the terminal device selects a cell with the highest ranking in the candidate cell set. If the candidate cell set is empty, the terminal device selects a network slice with the second priority. A subsequent determining behavior is as described above until a cell is selected.

In still another possible implementation, that the terminal device performs cell selection or cell reselection based on the priority information of each network slice includes the following.

The terminal device selects a first network slice from the at least one network slice, where a priority of the first network slice is the highest in the at least one network slice; the terminal device performs cell search to obtain a third cell; determines whether the third cell supports the first network slice; and when the third cell supports the first network slice, if the third cell satisfies a cell selection condition or a cell reselection condition, for example, a criterion S or a criterion R, the terminal device adds the third cell to a candidate cell set, and continues to search and perform the foregoing actions until no new cell is found. When the candidate cell set is not empty, the terminal device selects to camp on a cell with the best signal (for example, highest receive power or highest signal strength) in the candidate cell set; or when the candidate cell set is empty, the terminal device selects a second network slice, where a priority of the second network slice is lower than the priority of the first network slice, and continues to perform cell search until a suitable cell is selected.

Specifically, the terminal device treats the cell on which the terminal device current camps like all other cells. The terminal device selects a slice with a highest priority based on the priority information. The terminal device performs cell search to find a third cell (where for example, the cell satisfies a cell selection condition or a cell reselection condition, for example, a criterion S or a criterion R), and determines whether the third cell (the third cell may be understood as a cell found by the terminal device after performing the cell search) supports the network slice with the highest priority. If the third cell supports the network slice with the highest priority, the cell is added to the candidate cell set, and the terminal device continues searching until no new cell is found. If the candidate cell set is not empty, the terminal device selects a cell from the candidate cell set according to a cell reselection principle. If the candidate cell set is empty, the terminal device selects a network slice (for example, a second network slice) with the second priority. A subsequent action is as described above until a suitable cell is selected.

The foregoing describes an implementation in which the terminal device performs cell selection or reselection based on the priority of the network slice. The following describes an implementation in which the terminal device performs cell selection or reselection based on priorities of different network slices on different frequencies or priorities of different frequencies on different network slices.

In a possible implementation, the access network device determines a priority of each of at least one network slice for a first frequency; and the access network device sends a fifth message to the terminal device, where the fifth message includes the first frequency, an identifier of each network slice, and the priority corresponding to each network slice. Correspondingly, the terminal device receives the fifth message, and performs cell selection or reselection based on the fifth message. It may be understood that the fifth message may be sent in a broadcast manner, or may be sent in an RRC message manner. This is not limited herein.

Optionally, the fifth message may not include the priority corresponding to each network slice, and the priority of each network slice may be indirectly reflected by sorting of identifiers of the network slices. For example, a network slice in front has a higher network slice priority.

It may be understood that the first frequency is merely used as an example for description herein, but does not constitute a limitation on this embodiment of this application. Actually, the access network device may determine priority information of each network slice for each of a plurality of frequencies. This implementation may also be understood as a per frequency per slice manner.

For example, information elements included in the fifth message are shown as follows:

Carrier Frequency List
    carrier frequency (for example, absolute radio frequency channel number (ARFCN) value)
    network slice cell reselection priority list (sliceCellReselectionPriorityList)
        slice ID
        priority The slice ID may be S-NSSAI, or may be a slice index, or may be another slice identifier, for example, the RSA ID mentioned above. This is not limited herein. When the slice ID is the RSA ID, the fifth message provides a priority corresponding to each RSA ID at each frequency.

For example, an access network device in a slice area 1 may broadcast the following information in a broadcast message:

4.9 GHz, ultra-reliable low-latency communication (URLLC), High; enhanced mobile broadband (eMBB), Low; 2.6 GHz eMBB.

The foregoing information broadcast by the access network device in the slice area 1 may be understood as that: If the terminal device expects to support the URLLC service in the slice area 1, the terminal device preferably performs cell search on 4.9 GHz; or if the terminal device expects to support the eMBB service in the slice area 1, the terminal device preferably performs cell search on 2.6 GHz.

For example, an access network device in a slice area 2 may broadcast the following information in a broadcast message: 4.9 GHz eMBB.

The foregoing information broadcast by the access network device in the slice area 2 may be understood as that: the slice area 2 supports only the eMBB service, that is, UE supporting the eMBB service can perform cell search only on 4.9 GHz.

The foregoing is described by using an example in which the fifth message includes the network slice priority information of the first frequency. Actually, the fifth message may include network slice priority information of each of the plurality of frequencies. Optionally, the fifth message may include a plurality of frequencies, an identifier of a network slice corresponding to each frequency, and a priority corresponding to each network slice. For the terminal device, after receiving the fifth message, the terminal device may learn of priorities of different network slices for different frequencies. In other words, the terminal device may learn of priorities of the first network slice at different frequencies. A cell found by the terminal device at a first frequency, where the first frequency is a frequency with a highest priority of the first network slice. For example, in the foregoing example, the broadcast message of the access network device shows that for the URLLC service, 4.9 GHz has a high priority, and 2.6 GHz has a low priority or does not support the URLLC service. In this case, 4.9 GHz is the first frequency. After finding a cell at the first frequency, the terminal device selects, based on a cell selection condition or a cell reselection condition, a suitable cell for camping, for example, selects a cell with highest signal strength.

It should be noted that, the foregoing implementation describes a solution in which the access network device determines a priority of each of the at least one network slice for the first frequency; and sends the fifth message to the terminal device, where the fifth message includes the first frequency, the identifier of each network slice, and the priority corresponding to each network slice. It may be understood that this implementation is also applicable to the RSA ID. For example, the access network device can determine a priority of each of at least one RSA ID for a first frequency, and send a fifth message to the terminal device, where the fifth message includes the first frequency, each RSA ID, and a priority corresponding to each RSA ID. Correspondingly, the terminal device may determine a corresponding RSA ID based on the first network slice, and select a first frequency with the highest priority based on the RSA ID. Then, the terminal device searches for a cell at the first frequency, and finally selects, based on a cell selection condition or a cell reselection condition, a suitable cell for camping. The first network slice may be obtained by the terminal device in the foregoing manner of selecting a network slice, or may be selected based on a service requirement. This is not limited herein. For example, a NAS stratum of the terminal device notifies that a service of the first network slice needs to be initiated, that is, the NAS stratum notifies an AS stratum of an identifier of the first network slice.

In another possible implementation, the access network device determines a priority of each of at least one frequency for the first network slice, and sends a sixth message to the terminal device, where the sixth message includes an identifier of the first network slice, an identifier of each frequency, and a priority corresponding to each frequency. Correspondingly, the terminal device receives the sixth message. It may be understood that the sixth message may be sent in a broadcast manner, or may be sent in an RRC message manner. This is not limited herein.

Optionally, the sixth message may not include the priority corresponding to each network slice, and the priority of each frequency may be indirectly reflected by sorting of identifiers of the network slices. For example, a network slice in front has a higher network slice priority.

It may be understood that the first network slice is merely used as an example for description herein, but does not constitute a limitation on this embodiment of this application. Actually, the access network device may determine priority information of each frequency for each of a plurality of network slices. This implementation may also be understood as a per slice per frequency manner.

For example, information elements included in the sixth message are shown as follows:

Slice List
    slice ID
    carrier frequency list
        carrier frequency (for example, ARFCN value)
        priority In other words, the access network device may determine priorities of different frequencies on the first network slice, and send information such as the priority of each frequency, the identifier of the frequency, and the identifier of the first network slice to the terminal device. It may be understood that the first network slice is merely used as an example for description herein. Actually, the access network device may determine the priority of each frequency for each of a plurality of network slices.

The slice ID may be S-NSSAI, or may be a slice index, or may be another slice identifier, for example, the RSA ID mentioned above. This is not limited herein. When the slice ID is the RSA ID, the sixth message provides a priority corresponding to each frequency on each RSA ID. It should be noted that, the foregoing implementation describes a solution in which the access network device can determine the priority of each of the at least one frequency for the first network slice, and send the sixth message to the terminal device, where the sixth message includes the identifier of the first network slice, the identifier of each frequency, and the priority corresponding to each frequency. It may be understood that this implementation is also applicable to the RSA ID. For example, the access network device can determine a priority of each of at least one frequency for the RSA ID, and send a sixth message to the terminal device, where the sixth message includes the RSA ID, each frequency, and the priority corresponding to each frequency.

For the terminal device, the terminal device obtains a priority of each of at least one frequency for the first network slice; and performs cell selection at a first frequency, where the first frequency is a frequency with the highest priority in the at least one frequency.

The first network slice may be obtained by the terminal device in the foregoing manner of selecting a network slice, or may be selected based on a service requirement. This is not limited herein. For example, a NAS stratum of the terminal device notifies that a service of the first network slice needs to be initiated, that is, the NAS stratum notifies an AS stratum of an identifier of the first network slice.

The terminal device may listen to a cell broadcast message, to learn of information about a network slice, information about a frequency, priority information, and the like.

Herein, the terminal device may select the first frequency from the at least one frequency based on the priority of the first network slice at each frequency, and the first frequency is a frequency that is of the first network slice and that has the highest priority in the at least one frequency. For example, if both 2.6 GHz and 4.9 GHz support the first network slice, and a priority of the first network slice at 4.9 GHz is higher than a priority of the first network slice at 2.6 GHz, the selected first frequency is 4.9 GHz. Then, the terminal device performs cell search at the first frequency. There are the following two implementations in which the terminal device performs cell search at the first frequency.

Implementation 1. The network slice is deployed at a carrier granularity, that is, a cell found on the carrier definitely supports the network slice. After searching for a cell on the specified carrier, the terminal device adds a cell that meets a cell selection criterion S to a candidate cell set. Subsequently, the terminal device may sort cells in the candidate cell set based on a cell reselection criterion R, and then select a cell with the highest ranking. If the candidate cell set is empty, the terminal device selects a carrier that is of the first network slice and that has the second highest carrier priority (which may be understood as that the carrier priority of the carrier is lower than only a carrier with the highest carrier priority) to perform cell search, for example, perform cell search on 2.6 GHz. The foregoing procedure is repeated until a cell is selected.

Implementation 2. The network slice is deployed at an area granularity, that is, a cell found on a carrier may not support the network slice. After searching for a cell on the specified carrier, the terminal device adds a cell that supports the network slice and that meets a cell selection criterion S to a candidate cell set. Subsequently, the terminal device may sort cells in the candidate cell set based on a cell reselection criterion R, and select a cell with the highest ranking. If the candidate cell set is empty, the terminal device selects a carrier that is of the first network slice and that has the second highest carrier priority (which may be understood as that the carrier priority of the carrier is lower than only a carrier with the highest carrier priority) to perform cell search. The foregoing procedure is repeated until a cell is selected.

In the foregoing two implementations, the carrier is used as an example for description. Actually, the carrier may be replaced with a frequency.

When the slice ID broadcast by the access network device is the RSA ID, that is, the access network device can determine a priority of each of at least one frequency for the RSA ID, the terminal device may perform corresponding processing. Specifically, after obtaining the sixth message, the terminal device finds a corresponding RSA ID based on the identifier of the first network slice, and then obtains priorities of the RSA ID on different frequencies. For example, the terminal device finds a first frequency with the highest priority corresponding to the RSA ID, and then performs cell search at the first frequency. Subsequent operations are the same as those described above. The first network slice may be obtained by the terminal device in the foregoing manner of selecting a network slice, or may be selected based on a service requirement. This is not limited herein. For example, a NAS stratum of the terminal device notifies that a service of the first network slice needs to be initiated, that is, the NAS stratum notifies an AS stratum of an identifier of the first network slice. Herein, it is assumed that when the terminal device previously accesses another access network device, the terminal device has obtained a mapping relationship between the RSA ID and at least one network slice. For example, the terminal device previously accesses a first access network device, and the first access network device sends a mapping relationship between one or more groups of RSA IDs and the at least one network slice to the terminal device. For example, the mapping relationship that is between the one or more groups of RSA IDs and the at least one network slice and that is provided by the first access network device is as follows: An RSA ID #1 corresponds to an S-NSSAI #1 and an S-NSSAI #2, and an RSA ID #2 corresponds to an S-NSSAI #3, an S-NSSAI #4, and an S-NSSAI #5. When the terminal device receives a priority that is of each network slice supported by each frequency or a priority that is of each network slice at each frequency and that is broadcast by a current access network device. For example, the current access network device broadcasts that the RSA ID #1 has a high priority at 4.9 GHz, and the RSA ID #1 has a low priority at 2.6 GHz. If the terminal device expects to access the S-NSSAI #2 (it is assumed that the S-NSSAI #2 is the identifier of the first network slice), the terminal device may find, based on the mapping relationship (that the RSA ID #1 corresponds to the S-NSSAI #1 and the S-NSSAI #2) obtained from the first access network device, that the S-NSSAI #2 is corresponding to the RSA ID #1, and the terminal device may find, based on a frequency priority that is of the RSA ID #1 and that is broadcast by the current access network device, that a high-priority frequency of the RSA ID #1 is 4.9 GHz. The terminal device first performs cell search at 4.9 GHz. The terminal device performs cell search at 2.6 GHz only when no suitable cell is found at 4.9 GHz.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware. It may be understood that the technical features described in the method embodiments are also applicable to the following apparatus embodiments.

Figure 9:
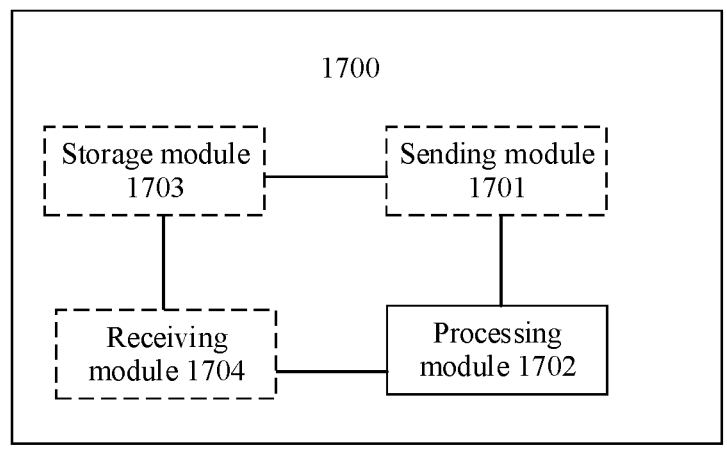
FIG. 9 is a schematic block diagram of an apparatus according to an embodiment of this application.

FIG. 9 is a schematic block diagram of an apparatus according to an embodiment of this application. As shown in FIG. 9, another embodiment of this application provides an apparatus 1700. The apparatus may be a terminal device, or may be a component (for example, an integrated circuit or a chip) of the terminal device. The apparatus may alternatively be a network device (where the network device may be an access network device or a core network element), or may be a component (for example, an integrated circuit or a chip) of a network device. The apparatus may alternatively be another communication module configured to implement the method in the method embodiments of this application. The apparatus 1700 may include a processing module 1702 (e.g., a processing unit). Optionally, the apparatus 1700 may further include a sending module 1701 (e.g., a sending unit), a receiving module 1704 (e.g., a receiving unit), and a storage module 1703 (e.g., a storage unit). The sending module 1701 and the receiving module 1704 may constitute a transceiver unit, and have both a receiving function and a sending function. The processing module 1702 may be a processor. The sending module 1701 may be a transmitter. The receiving module 1704 may be a receiver. The receiver and the transmitter may be integrated to constitute a transceiver.

In a possible design, one or more modules in FIG. 9 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be disposed separately, or may be integrated.

The apparatus has a function of implementing the terminal device described in embodiments of this application. For example, the apparatus includes a corresponding module, unit, or means used for the terminal device to perform the steps related to the terminal device and described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments.

Alternatively, the apparatus has a function of implementing the network device described in embodiments of this application. For example, the apparatus includes a corresponding module, unit, or means used for the network device to perform the steps related to the network device that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments.

Optionally, the modules in the apparatus 1700 in this embodiment of this application may be configured to perform the method described in FIG. 2 in embodiments of this application.

In a possible implementation, the apparatus 1700 may include a sending module 1701 and a processing module 1702.

In a possible implementation, the processing module 1702 is configured to broadcast a first identifier, where the first identifier identifies information about a first access network slice.

The sending module 1701 is configured to send a radio resource control RRC message to a terminal device, where the RRC message includes information about at least one first network slice corresponding to the first identifier.

Optionally, the apparatus 1700 further includes a receiving module 1704. The receiving module 1704 is configured to: before the terminal device sends the RRC message, receive a request message from the terminal device, where the request message requests the information about the at least one first network slice corresponding to the first identifier.

Optionally, the RRC message further includes a second identifier and information about at least one second network slice corresponding to the second identifier, and the second identifier identifies information about a second access network slice.

Optionally, the receiving module 1704 is further configured to receive a first message from a second access network device, where the first message includes the second identifier and the information about the at least one second network slice corresponding to the second identifier.

Alternatively, in a possible implementation, the apparatus 1700 includes a processing module 1702 and a sending module 1701. The processing module 1702 is configured to determine a priority of each of the at least one network slice for a first frequency.

The sending module 1701 is configured to send a fifth message, where the fifth message includes the first frequency, an identifier of each network slice, and the priority corresponding to each network slice.

Alternatively, in a possible implementation, the apparatus 1700 includes a processing module 1702 and a sending module 1701. The processing module 1702 is configured to determine a priority of each of at least one frequency for a first network slice.

The sending module 1701 is configured to send a sixth message, where the sixth message includes an identifier of the first network slice, an identifier of each frequency, and the priority corresponding to each frequency.

It may be understood that the apparatus 1700 may correspond to the method of the access network device in the foregoing method embodiment, for example, the method in FIG. 2. In addition, the foregoing and other management operations and/or functions of the modules in the apparatus 1700 are separately used to implement corresponding steps of the method of the access network device in the foregoing method embodiment. Therefore, beneficial effects in the foregoing method embodiment can also be implemented. For brevity, details are not described herein again.

In another possible implementation, the apparatus 1700 may include a receiving module 1704 and a processing module 1702.

In a possible implementation, the processing module 1702 is configured to obtain a first identifier, where the first identifier identifies information about a first access network slice.

The receiving module 1704 is configured to receive an RRC message from a first access network device, where the RRC message includes information about at least one first network slice corresponding to the first identifier.

Optionally, the apparatus 1700 further includes a sending module 1701. The sending module 1701 is configured to send a request message to the first access network device, where the request message requests the information about the at least one first network slice corresponding to the first identifier.

Optionally, the RRC message further includes a second identifier and information about at least one second network slice corresponding to the second identifier, and the second identifier identifies information about a second access network slice.

Alternatively, in a possible implementation, the apparatus 1700 includes a processing module 1702 and a receiving module 1704. The receiving module 1704 is configured to receive a paging message from a network device, where the paging message includes information about a first network slice.

The processing module 1702 is configured to perform cell reselection if a cell in which the apparatus 1700 is currently located does not support the first network slice.

Optionally, that the processing module 1702 is configured to perform cell reselection includes performing cell reselection based on a first mapping relationship, where the first mapping relationship includes the information about the first network slice and information about a second network slice, and there is a remapping relationship between the information about the first network slice and the information about the second network slice.

Optionally, that the processing module 1702 is configured to perform cell reselection based on the first mapping relationship includes: if the cell in which the apparatus 1700 is currently located supports the second network slice, initiating a random access procedure in the cell in which the apparatus 1700 is currently located; or if the cell in which the apparatus 1700 is currently located does not support the second network slice, selecting a cell that supports the second network slice.

Optionally, the apparatus 1700 further includes a sending module 1701. The sending module 1701 is configured to send a second message to the network device, where the second message includes information about the first network slice and information about the second network slice, or the second message includes information about the second network slice.

Optionally, the sending module 1701 is further configured to send a third message to the network device, where the third message notifies that the terminal device fails to select the cell.

Alternatively, in a possible implementation, the apparatus 1700 includes a processing module 1702. The processing module 1702 is configured to obtain priority information of each of at least one network slice.

The processing module 1702 is further configured to perform cell selection or cell reselection based on priority information of each network slice.

Alternatively, in a possible implementation, the apparatus 1700 includes a processing module 1702. The processing module 1702 is configured to obtain a priority of each of at least one frequency for a first network slice.

The processing module 1702 is further configured to perform cell search on a first frequency, where the first frequency is a frequency with the highest priority in the at least one frequency.

Optionally, the processing module 1702 is further configured to: if no cell is found at the first frequency, perform cell search at a second frequency, where a priority of the second frequency is lower than that of the first frequency.

Optionally, the apparatus 1700 further includes a receiving module 1704. That the apparatus 1701 is configured to obtain a priority of each of at least one frequency for a first network slice includes: invoking the receiving module 1704 to receive a sixth message from a network device, where the sixth message includes an identifier of the first network slice, an identifier of each frequency, and the priority corresponding to each frequency.

It may be understood that the apparatus 1700 may correspond to the method of the terminal device in the foregoing method embodiment, for example, the method in FIG. 2 or FIG. 7. In addition, the foregoing and other management operations and/or functions of the modules in the apparatus 1700 are separately used to implement corresponding steps of the method of the terminal device in the foregoing method embodiment. Therefore, beneficial effects in the foregoing method embodiment can also be implemented. For brevity, details are not described herein again.

In a possible implementation, the apparatus 1700 may include a sending module 1701 and a processing module 1702.

The processing module 1702 is configured to determine a priority of each of the at least one network slice.

The sending module 1701 is configured to send a fourth message, where the fourth message includes an identifier of each network slice and the priority corresponding to each network slice.

Optionally, the processing module 1702 is further configured to: if no cell is found at the first frequency, perform cell search at a second frequency, where a priority of the second frequency is lower than that of the first frequency.

It may be understood that the apparatus 1700 may correspond to the method of the core network element in the foregoing method embodiment, for example, the method in FIG. 8. In addition, the foregoing and other management operations and/or functions of the modules in the apparatus 1700 are separately used to implement corresponding steps of the method of the core network element in the foregoing method embodiment. Therefore, beneficial effects in the foregoing method embodiment can also be implemented. For brevity, details are not described herein again.

Figure 10:
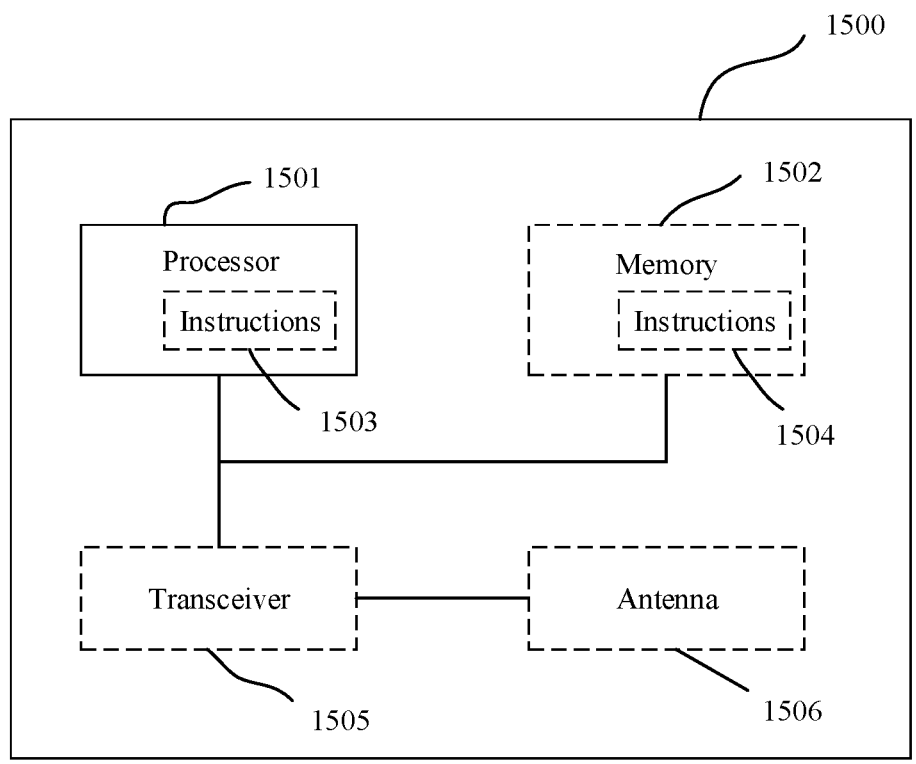
FIG. 10 is a schematic diagram of a structure of another apparatus according to an embodiment of this application.

FIG. 10 is a schematic diagram of a structure of an apparatus. The apparatus 1500 may be a network device (where the network device may be an access network device or a core network element), may be a terminal device, may be a chip, a chip system, a processor, or the like that supports a network device in implementing the foregoing method, or may be a chip, a chip system, a processor, or the like that supports a terminal device in implementing the foregoing method. The apparatus may be configured to implement the methods described in the foregoing method embodiments. For details, refer to the descriptions in the foregoing method embodiments.

The apparatus 1500 may include one or more processors 1501. The processor 1501 may also be referred to as a processing unit, and may implement a specific control function. The processor 1501 may be a general-purpose processor, a dedicated processor, or the like. For example, the processor 1501 may be a baseband processor or a central processing unit. The baseband processor may be configured to process a communication protocol and communication data. The central processing unit may be configured to control a communication apparatus (for example, a core network element, a base station, a baseband chip, a terminal, a terminal chip, a DU, or a CU), execute a software program, and process data of the software program.

In an optional design, the processor 1501 may alternatively store instructions and/or data 1503, and the instructions and/or data 1503 may be run by the processor, so that the apparatus 1500 performs the methods described in the foregoing method embodiments.

In another optional design, the processor 1501 may include a transceiver unit configured to implement sending and receiving functions. For example, the transceiver unit may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, the apparatus 1500 may include a circuit, and the circuit may implement the sending, receiving, or communication function in the foregoing method embodiments.

Optionally, the apparatus 1500 may include one or more memories 1502. The memory 1502 may store instructions 1504, and the instructions may be run on the processor, so that the apparatus 1500 performs the methods described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 1500 may further include a transceiver 1505 and/or an antenna 1506. The processor 1501 may be referred to as a processing unit, and control the apparatus 1500. The transceiver 1505 may be referred to as a transceiver unit, a transceiver device, a transceiver circuit, a transceiver, or the like, and is configured to implement a transceiver function.

In a possible design, an apparatus 1500 (for example, an integrated circuit, a wireless device, a circuit module, or a terminal device) may be configured to implement a method performed by the access network device, or configured to implement a method performed by the terminal device, or configured to implement a method performed by the core network element in embodiments of this application.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

The apparatus in the foregoing embodiment may be a core network element, an access device, or a terminal device. However, a scope of the apparatus described in this application is not limited thereto, and a structure of the apparatus may not be limited by FIG. 10. The apparatus may be an independent device, or may be a part of a larger device. For example, the apparatus may be: (1) an independent integrated circuit IC, a chip, or a chip system or subsystem; (2) a set of one or more ICs, where optionally, the IC set may further include a storage component configured to store data and/or instructions; (3) an ASIC, for example, a modem (MSM); (4) a module that can be embedded in another device; (5) a receiver, a terminal, an intelligent terminal, a cellular phone, a wireless device, a handheld device, a mobile unit, a vehicle-mounted device, a network device, a cloud device, an artificial intelligence device, or the like; or (6) others, or the like.

Figure 11:
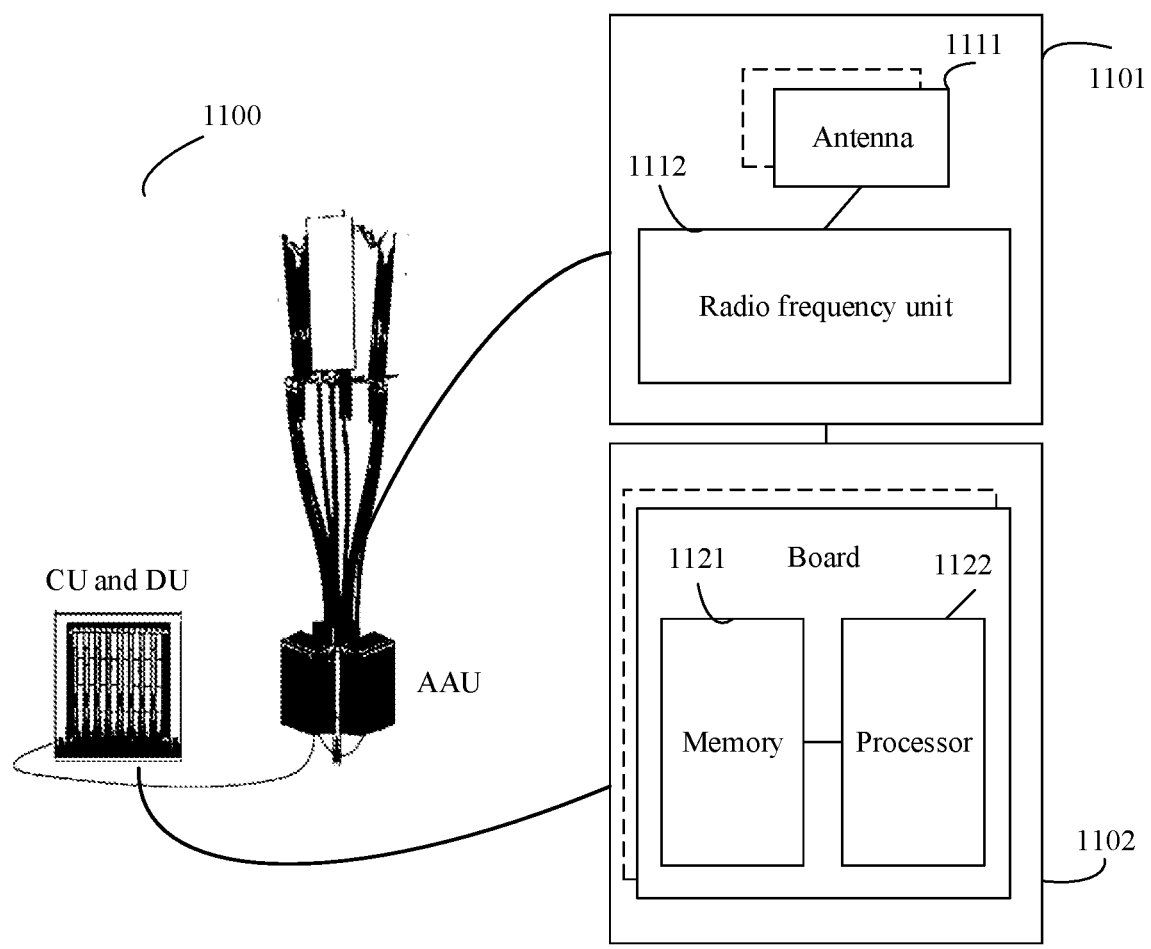
FIG. 11 is a schematic diagram of a structure of an access network device according to an embodiment of this application.

FIG. 11 is a schematic diagram of a structure of an access network device according to an embodiment of this application, for example, may be a schematic diagram of a structure of a base station 3000. The base station 3000 may be used in the system shown in FIG. 1, to perform functions of the access network device in the foregoing method embodiments.

In a 5G communication system, the access network device 1100 may include a CU, a DU, and an active antenna unit (AAU). The CU and the DU may communicate with each other through an interface. A control plane (CP) interface may be Fs-C, for example, F1-C, and a user plane (UP) interface may be Fs-U, for example, F1-U.

The CU, the DU, and the AAU may be separated or integrated. Therefore, there are a plurality of network deployment forms. A possible deployment form in which the CU and the DU are co-deployed on hardware is shown in FIG. 11. It should be understood that FIG. 11 is merely an example, and constitutes no limitation on the protection scope of this application. For example, the deployment form may alternatively be that DUs are deployed in a 5G BBU room, CUs or DUs are deployed together, or CUs are centralized at a higher level.

The AAU may include a transceiver unit 1101, corresponding to the receiving unit 1020 and the sending unit 1010 in FIG. 10. Optionally, the transceiver unit 1101 may also be referred to as a transceiver machine, a transceiver circuit, a transceiver, or the like, and may include at least one antenna 1111 and a radio frequency unit 1112. Optionally, the transceiver unit 1101 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The AAU is mainly configured to: send and receive a radio frequency signal, and perform conversion between the radio frequency signal and a baseband signal. For example, the AAU is configured to send the message or information in the foregoing embodiments to a terminal device. The CU and the DU may implement an internal processing function, and are referred to as a processing unit 1102, which is configured to perform baseband processing, control a base station, and the like. The AAU and the CU together with the DU may be physically disposed together, or may be physically disposed separately, that is, a distributed base station.

The CU and the DU are a control center of the access network device, and may also be referred to as a processing module (or a processing unit). The CU and the DU may correspond to the processing module 1702, and are mainly configured to implement a baseband processing function such as channel encoding, multiplexing, modulation, and spreading. For example, the CU and the DU (the processing module 1702) 1102 may be configured to control the access network device 1100 to perform an operation procedure of the access network device (for example, the first access network device) in the foregoing method embodiments.

In an example, the CU and the DU may include one or more boards, and a plurality of boards may together support a radio access network (for example, an LTE system, or a 5G system) of a single access standard, or may separately support radio access networks of different access standards. The CU and the DU further include a memory 1121 and a processor 1122. The memory 1121 is configured to store necessary instructions and necessary data. The processor 1122 is configured to control the base station to perform a necessary action, for example, configured to control the base station to perform an operation procedure related to the access network device in the foregoing method embodiments. The memory 1121 and the processor 1122 may serve one or more boards. In other words, a memory and a processor may be independently disposed on each board. Alternatively, a plurality of boards may share a same memory and a same processor. In addition, a necessary circuit may be further disposed on each board.

The CU and DU 1102 may be configured to perform an action implemented inside the access network device in the foregoing method embodiments, and the AAU may be configured to perform an action of sending from the access network device to the terminal device in the foregoing embodiments or an action of receiving from the terminal device in the foregoing method embodiments. For details, refer to the descriptions in the foregoing method embodiments. Details are not described herein again.

In addition, the access network device is not limited to the form shown in FIG. 11, and may also be in another form. For example, the access network device includes a BBU and an adaptive radio unit (ARU), or includes a BBU and an active antenna unit (AAU), or may be customer premises equipment (CPE), or may be in another form. This is not limited in this application.

It should be understood that the access network device 1100 shown in FIG. 11 can implement functions of the access network device in the foregoing method embodiments (for example, FIG. 2 to FIG. 8). Operations and/or functions of the units of the access network device 1100 are separately used to implement corresponding procedures performed by the access network device in the foregoing method embodiments of this application. To avoid repetition, detailed descriptions are appropriately omitted herein. The structure of the access network device shown in FIG. 11 is merely a possible form, but shall not constitute any limitation on embodiments of this application. According to this application, a possibility that an access network device structure in another form in the future is not excluded.

Figure 12:
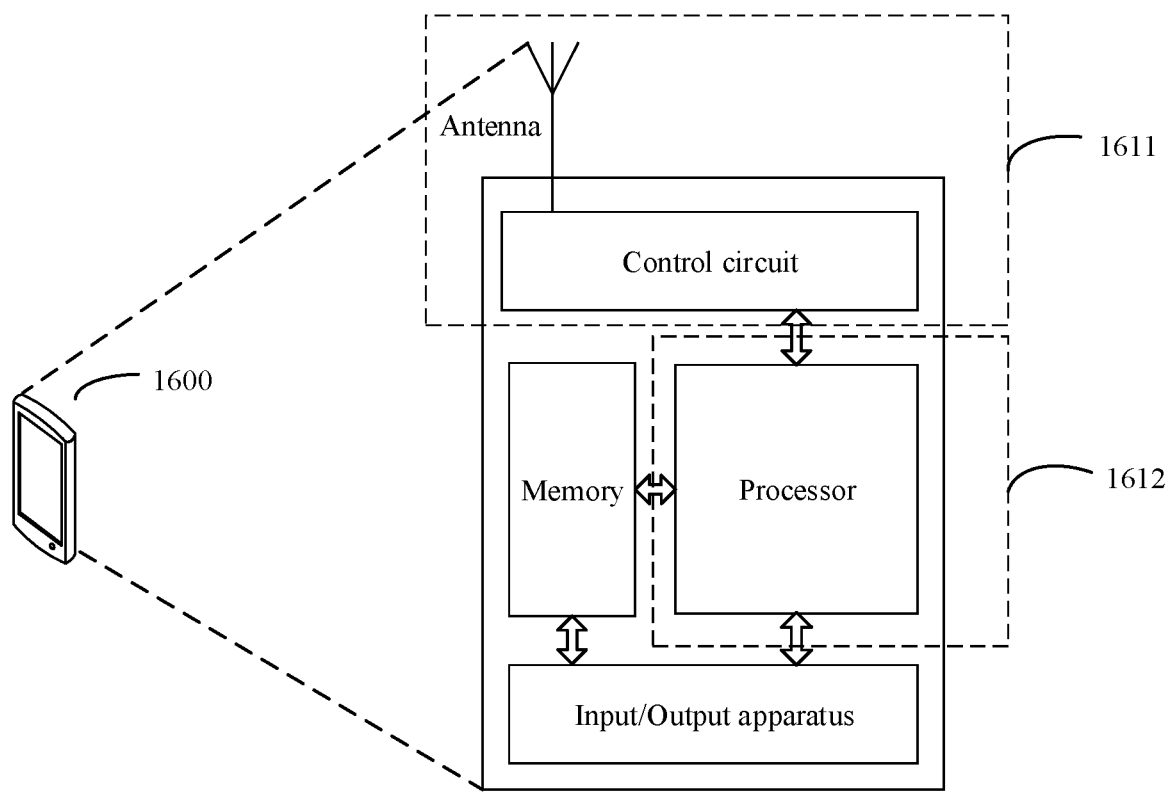
FIG. 12 is a schematic diagram of a structure of a terminal device according to an embodiment of this application.

FIG. 12 provides a schematic diagram of a structure of a terminal device. The terminal device is applicable to the scenario shown in FIG. 1. For ease of description, FIG. 12 shows only main components of the terminal device. As shown in FIG. 12, the terminal device 1600 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user.

After the terminal device is powered on, the processor may read the software program in a storage unit, parse and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives the radio frequency signal by using the antenna, further converts the radio frequency signal into a baseband signal, and outputs the baseband signal to the processor. The processor converts the baseband signal into data, and processes the data.

For ease of description, FIG. 12 shows only one memory and one processor. In an actual terminal device, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 12. A person skilled in the art may understand that the baseband processor and the central processing unit each may be an independent processor, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have a transceiver function may be considered as a transceiver unit 1611 of the terminal device 1600, and the processor that has a processing function may be considered as a processing unit 1612 of the terminal device 1600. As shown in FIG. 12, the terminal device 1600 includes the transceiver unit 1611 and the processing unit 1612. The transceiver unit may also be referred to as a transceiver, a transceiver machine, a transceiver apparatus, or the like. Optionally, a component that is in the transceiver unit 1611 and that is configured to implement a receiving function may be considered as a receiving unit, and a component that is in the transceiver unit 1611 and that is configured to implement a sending function may be considered as a sending unit. In other words, the transceiver unit 1611 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like. Optionally, the receiving unit and the sending unit may be one integrated unit, or may be a plurality of independent units. The receiving unit and the sending unit may be in one geographical location, or may be distributed in a plurality of geographical locations.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

It should be understood that the processor in this embodiment of this application may be an integrated circuit chip, and has a signal processing capability. In an implementation process, the steps in the foregoing method embodiments may be completed by using a hardware integrated logic circuit or instructions in a form of software in the processor. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing circuit (DSP), a microcontroller unit (MCU), a programmable logic device (PLD), or another integrated chip. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a volatile memory or a non-volatile memory, or may include both a volatile memory and a non-volatile memory. The non-volatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification is intended to include, but not limited to, these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, a function of any one of the foregoing method embodiments is implemented.

According to the methods provided in embodiments of this application, this application further provides a system. The system includes the foregoing one or more terminal devices and the foregoing one or more access network devices. Optionally, the system may further include a core network element.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid state drive (SSD)), or the like.

It should be understood that, an "embodiment" mentioned throughout this specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It should be understood that, in embodiments of this application, sequence numbers of the foregoing processes do not mean execution sequences. The execution sequences of the processes should be determined based on functions and internal logic of the processes, and should not constitute any limitation to implementation processes of embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that various reference numerals such as "first" and "second" in this application are merely used for differentiation for ease of description, and are not used to limit a scope of embodiments of this application, or represent a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. A may be singular or plural, and B may be singular or plural.

The character "/" usually indicates an "or" relationship between associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It should be understood that in embodiments of this application, "B corresponding to A" indicates that B is associated with A, and B may be determined based on A. However, it should be further understood that determining B based on A does not mean that B is determined based on only A. B may alternatively be determined based on A and/or other information.

The correspondences shown in the tables in this application may be configured, or may be predefined. Values of the information in the tables are merely examples, and other values may be configured. This is not limited in this application. When a correspondence between configuration information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

It is uniformly described herein, that "predefine" in embodiments in this application may be understood as "define", "predefine", "store", "pre-store", "pre-negotiate", "pre-configure", "solidify", or "pre-burn". The configuration in embodiments of this application may be understood as notification by using RRC signaling, MAC signaling, or physical layer information. The physical layer information may be transmitted by using a PDCCH or a PDSCH.

A person of ordinary skill in the art may be aware that, in combination with the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for a purpose of convenient and brief descriptions, for a detailed working process of the foregoing system, apparatus, and unit, refer to a corresponding process in the foregoing method embodiment. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, carried out by a core network device, the method comprising:
   receiving, from a first access network device, a first identifier and a first network slice identifier list comprising at least one network slice identifier, wherein:
     there is a correspondence between the first identifier and the first network slice identifier list, and
     each network slice identifier of the first network slice identifier list is identified by single network slice selection assistance information (S-NSSAI); and
   sending the correspondence between the first identifier and the first network slice identifier list to a terminal device by using a non-access stratum (NAS) message.

2. The method according to claim 1, wherein the correspondence between the first identifier and the first network slice list remains unchanged in a tracking area (TA) range.

3. The method according to claim 2 wherein the TA range is identified by a tracking area code (TAC).

4. The method according to claim 1, wherein the first identifier identifies information about a first access network slice.

5. The method according to claim 1, wherein the correspondence between the first identifier and the first network slice identifier list is carried in a network generation (NG) interface message.

6. The method according to claim 5, wherein the NG message comprises an NG interface setup request or a radio access network (RAN) configuration update message.

7. The method according to claim 1, wherein the NAS message comprises a Registration Accept or a user equipment (UE) configuration update command.

8. A communication method, carried out by a terminal device, the method comprising:
   sending, to a core network device via a first access network device, a request message that requests information of a first network slice identifier list comprising at least one network slice identifier, wherein:
     there is a correspondence between a first identifier and the first network slice identifier list, and
     each network slice identifier of the first network slice identifier list is identified by single network slice selection assistance information (S-NSSAI);
   receiving the correspondence between the first identifier and the first network slice identifier list from the core network device by using a non-access stratum (NAS) message.

9. The method according to claim 8, wherein the correspondence between the first identifier and the first network slice list remains unchanged in a tracking area (TA) range.

10. The method according to claim 9 wherein the TA range is identified by a tracking area code (TAC).

11. The method according to claim 8, wherein the first identifier identifies information about a first access network slice.

12. The method according to claim 8, wherein the NAS message comprises a registration accept or a user equipment (UE) configuration update command.

13. A communication method, carried out by a first access network device, the method comprising:
   broadcasting, by a first access network device, a first identifier,
   sending, to a core network device, the first identifier and a first network slice identifier list comprising at least one network slice identifier, wherein:
     there is a correspondence between the first identifier and the first network slice identifier list, and
     each network slice identifier of the first network slice identifier list is identified by single network slice selection assistance information (S-NSSAI).

14. The method according to claim 13, wherein the correspondence between the first identifier and the first network slice list remains unchanged in a tracking area (TA) range.

15. The method according to claim 14, wherein the TA range is identified by a tracking area code (TAC).

16. The method according to claim 13, wherein the first identifier identifies information about a first access network slice.

17. The method according to claim 13, wherein the NG message comprises an NG interface setup request or a radio access network (RAN) configuration update message.

18. The method according to claim 13, wherein the NAS message comprises a registration accept or a user equipment (UE) configuration update command.

19. The method according to claim 13, further comprising:
   obtaining, by the first access network device, a correspondence between a second identifier and a second network slice identifier list, wherein the second identifier identifies information about a second access network slice.

20. The method according to claim 19, wherein the obtaining, by the first access network device, the correspondence between the second identifier and the second network slice identifier list, wherein the second identifier identifies information about a second access network slice, comprises:
   receiving, by the first access network device, the correspondence between the second identifier and a network slice identifier list from the second access network by using a Xn interface message; or
   obtaining, by the first access network device, the correspondence between the second identifier and the second network slice identifier list from operation administration and maintenance (OAM).

\* \* \* \* \*